US012614147B2

(12) United States Patent
Sahoo

(10) Patent No.: US 12,614,147 B2
(45) Date of Patent: Apr. 28, 2026

(54) SYSTEMS AND METHODS FOR ALERTS AND NOTIFICATIONS IN AN ADVANCED DISTRIBUTION PLATFORM

(71) Applicant: Ingram Micro Inc., Irvine, CA (US)

(72) Inventor: Sanjib Sahoo, Naperville, IL (US)

(73) Assignee: Ingram Micro Inc., Irvine, CA (US)

( * ) Notice: Subject to any disclaimer, the term of this patent is extended or adjusted under 35 U.S.C. 154(b) by 0 days.

(21) Appl. No.: 18/599,388

(22) Filed: Mar. 8, 2024

(65) Prior Publication Data

US 2025/0005504 A1     Jan. 2, 2025

Related U.S. Application Data

(63) Continuation-in-part of application No. 18/349,836, filed on Jul. 10, 2023, and a continuation of application No. 18/341,714, filed on Jun. 26, 2023.

(Continued)

(51) Int. Cl.
    *G06Q 10/0835*          (2023.01)
(52) U.S. Cl.
    CPC .................................. *G06Q 10/0835* (2013.01)
(58) Field of Classification Search
    CPC .................................................. G06Q 10/0835
    See application file for complete search history.

(56) References Cited

U.S. PATENT DOCUMENTS 5,237,495 A  *  8/1993  Morii ........................ G07G 1/00
                                                        705/28
5,515,269 A  *  5/1996  Willis .................. G06Q 10/087
                                                        705/29

(Continued)

FOREIGN PATENT DOCUMENTS

AU      2019101249 A4  *  11/2019  ........... H04L 9/3236
CN        101025799 A      8/2007

(Continued)

OTHER PUBLICATIONS

Rowan Sutton, "A Reinforcement Learning and Synthetic Data Approach to Mobile Notification Management", published in 2019 by ACM, all pages (Year: 2019).*

(Continued)

*Primary Examiner* — Omar Zeroual
(74) *Attorney, Agent, or Firm* — Ice Miller LLP

(57)                    ABSTRACT

Computerized systems and methods are provided for managing alerts and notifications within a technology distribution platform. A Single Pane of Glass User Interface (SPoG UI) presents notifications to users enabling interaction and customization. A Real-Time Data Mesh (RTDM) collects, filters, enriches, and standardizes event data from multiple sources into a uniform format. An Event Adapter formats data to be processed by a Notification Engine, configured to determine one or more notification triggers and generate alert content based on established rules and algorithms. A logging and user interaction module tracks user interactions with notifications. User feedback is processed by an Advanced Analytics and Machine Learning (AAML) Module configured to dynamically adapt notification logic. Notification content and delivery mechanisms are refined by a Distribution Module to ensure effective dissemination across various communication channels.

12 Claims, 28 Drawing Sheets

Related U.S. Application Data

(60) Provisional application No. 63/515,076, filed on Jul. 21, 2023, provisional application No. 63/515,075, filed on Jul. 21, 2023, provisional application No. 63/513,078, filed on Jul. 11, 2023, provisional application No. 63/513,073, filed on Jul. 11, 2023.

(56) References Cited

U.S. PATENT DOCUMENTS

| | | | |
|---|---|---|---|
| 5,870,717 A | | 2/1999 | Wiecha |
| 5,870,719 A | * | 2/1999 | Maritzen ............... G06Q 30/02 705/26.1 |
| 6,093,559 A | | 7/2000 | Bookbinder et al. |
| 6,167,383 A | * | 12/2000 | Henson ................ G06Q 10/087 705/26.7 |
| 6,272,472 B1 | | 8/2001 | Danneels |
| 6,385,543 B1 | | 5/2002 | Keiser |
| 7,024,459 B2 | | 4/2006 | McNamara |
| 7,039,604 B1 | * | 5/2006 | Srinivasan ............. G06Q 30/06 705/26.82 |
| 7,065,499 B1 | * | 6/2006 | Seth ................... G06Q 30/0641 705/26.81 |
| 7,085,729 B1 | * | 8/2006 | Kennedy .......... G06Q 10/06315 705/7.22 |
| 7,130,853 B2 | | 10/2006 | Roller |
| 7,151,438 B1 | | 12/2006 | Hall |
| 7,188,075 B1 | * | 3/2007 | Smirnov ................ G06Q 30/06 705/7.35 |
| 7,302,405 B2 | | 11/2007 | Hoskin |
| 7,471,990 B2 | * | 12/2008 | Hotta ................... G06Q 10/087 700/106 |
| 7,548,612 B2 | | 6/2009 | Weissman et al. |
| 7,584,155 B1 | * | 9/2009 | Carter, III .............. G06Q 30/02 705/400 |
| 7,698,170 B1 | | 4/2010 | Darr et al. |
| 7,720,720 B1 | | 5/2010 | Sharma et al. |
| 7,912,899 B2 | * | 3/2011 | Beauchamp ......... G06Q 10/107 709/204 |
| 8,015,021 B2 | | 9/2011 | Boyle |
| 8,024,059 B2 | * | 9/2011 | Kienzle .............. G06Q 10/0875 700/106 |
| 8,024,217 B2 | * | 9/2011 | Sadre ................. G06Q 30/0283 705/7.29 |
| 8,069,435 B1 | | 11/2011 | Lai |
| 8,091,065 B2 | | 1/2012 | Mir et al. |
| 8,237,792 B2 | | 8/2012 | Uehara |
| 8,255,454 B2 | * | 8/2012 | Broda ................... H04L 67/145 709/219 |
| 8,301,522 B2 | * | 10/2012 | Sun ................... G06Q 30/0283 705/26.1 |
| 8,386,296 B2 | * | 2/2013 | Hage ................... G06Q 10/087 705/7.29 |
| 8,443,036 B2 | | 5/2013 | Li et al. |
| 8,452,636 B1 | * | 5/2013 | Verastigui .......... G06Q 30/0201 705/7.29 |
| 8,589,444 B2 | | 11/2013 | Alcorn |
| 8,738,421 B1 | | 5/2014 | Ali |
| 8,781,882 B1 | | 7/2014 | Arboletti et al. |
| D718,324 S | | 11/2014 | Lee et al. |
| 9,063,943 B1 | | 6/2015 | Smith |
| 9,317,807 B1 | | 4/2016 | Staddon |
| 9,390,089 B2 | | 7/2016 | Pitzo et al. |
| 9,652,530 B1 | | 5/2017 | Bendersky et al. |
| 9,727,906 B1 | | 8/2017 | Sarmento |
| 9,781,212 B2 | | 10/2017 | Briere |
| 9,792,597 B1 | | 10/2017 | Jen |
| 9,805,412 B1 | | 10/2017 | Joseph |
| 9,958,291 B1 | | 5/2018 | Shunturov et al. |
| 9,959,551 B1 | | 5/2018 | Schermerhorn |
| 9,965,526 B1 | | 5/2018 | Chanda |
| 10,114,964 B2 | | 10/2018 | Ramesh |
| 10,134,003 B1 | * | 11/2018 | Loyens ................ G06Q 10/087 |
| 10,146,751 B1 | | 12/2018 | Zhang |
| 10,277,672 B2 | | 4/2019 | Kung |
| D851,110 S | | 6/2019 | Bang et al. |
| 10,373,105 B2 | | 8/2019 | Feng |
| 10,410,125 B1 | | 9/2019 | Finkelstein et al. |
| 10,417,728 B1 | | 9/2019 | Yoggi et al. |
| 10,489,845 B2 | | 11/2019 | Mullakkara |
| 10,592,852 B1 | * | 3/2020 | Karipides .......... G06Q 30/0202 |
| D880,498 S | | 4/2020 | Shahidi et al. |
| 10,616,347 B1 | | 4/2020 | Van Oort et al. |
| 10,650,449 B2 | | 5/2020 | Courbage |
| 10,664,799 B2 | * | 5/2020 | O'Brien ............... H04L 9/3239 |
| 10,693,824 B2 | | 6/2020 | Silva |
| 10,699,329 B2 | | 6/2020 | Zakula |
| 10,718,632 B1 | | 7/2020 | Platt et al. |
| 10,757,154 B1 | | 8/2020 | Jacobs |
| D898,759 S | | 10/2020 | Carrigan et al. |
| 10,839,029 B2 | | 11/2020 | Lawrence |
| 10,861,077 B1 | * | 12/2020 | Liu ....................... G06Q 30/06 |
| 10,891,105 B1 | | 1/2021 | Gates et al. |
| 10,893,036 B2 | | 1/2021 | Chang et al. |
| D912,694 S | | 3/2021 | Clarke et al. |
| D920,351 S | | 5/2021 | Zhang |
| 11,036,713 B2 | * | 6/2021 | Inturi .................. G06F 21/6227 |
| 11,062,319 B1 | * | 7/2021 | Hecht ................... G06Q 20/10 |
| 11,074,643 B1 | * | 7/2021 | Ellithorpe ............. G06Q 20/14 |
| 11,080,239 B2 | | 8/2021 | Demoor |
| 11,113,770 B1 | * | 9/2021 | Magoon ................. G16H 10/60 |
| 11,151,608 B1 | * | 10/2021 | Guo ................... G06Q 30/0277 |
| D937,299 S | | 11/2021 | Varga et al. |
| 11,163,846 B1 | * | 11/2021 | Kadayam ............ G06F 16/9535 |
| 11,171,950 B1 | | 11/2021 | Zhuravlev et al. |
| 11,176,693 B1 | | 11/2021 | Gonzalez-Nicolas |
| D937,851 S | | 12/2021 | Patel et al. |
| 11,205,147 B1 | | 12/2021 | Anderson |
| 11,282,145 B2 | | 3/2022 | Ehrhart |
| 11,334,554 B2 | | 5/2022 | Andreakis |
| 11,343,142 B1 | | 5/2022 | Wang et al. |
| 11,379,219 B2 | | 7/2022 | Bhalla et al. |
| 11,386,456 B1 | * | 7/2022 | Lightbody ......... G06Q 30/0256 |
| 11,487,797 B2 | | 11/2022 | Shukla |
| 11,556,864 B2 | * | 1/2023 | Yuan ........................ G06N 7/01 |
| 11,620,310 B1 | * | 4/2023 | Akidau ................. G06F 16/256 707/615 |
| 11,714,537 B2 | | 8/2023 | Lin et al. |
| 11,714,698 B1 | * | 8/2023 | Curtis ................... G06F 18/214 714/48 |
| 11,729,058 B1 | | 8/2023 | Agarwal et al. |
| 11,798,058 B2 | | 10/2023 | Silverstein |
| 11,811,928 B2 | | 11/2023 | Shaaban et al. |
| 11,816,721 B2 | | 11/2023 | Ksyta |
| D1,009,077 S | | 12/2023 | Matlin et al. |
| D1,011,377 S | | 1/2024 | Ye |
| 11,860,613 B2 | * | 1/2024 | Maury ............... G06Q 10/0631 |
| 11,886,965 B1 | | 1/2024 | Schwartz |
| D1,013,709 S | | 2/2024 | Callanta et al. |
| 11,892,817 B2 | * | 2/2024 | Jacobs .................. G06Q 50/04 |
| 11,899,678 B2 | | 2/2024 | Kadel |
| 11,906,415 B1 | | 2/2024 | Galburt |
| 11,977,964 B1 | * | 5/2024 | Winstead .............. G06N 20/00 |
| 11,983,806 B1 | | 5/2024 | Ramesh et al. |
| 12,014,375 B2 | | 6/2024 | Brakob et al. |
| 12,077,313 B1 | | 9/2024 | Whaley et al. |
| D1,044,841 S | | 10/2024 | Shriniwar |
| 12,106,621 B2 | * | 10/2024 | Boerger ............... G05D 1/0225 |
| 12,107,934 B1 | * | 10/2024 | Bailey ................... H04L 67/34 |
| 12,142,091 B2 | | 11/2024 | Fang |
| 12,204,323 B1 | | 1/2025 | Malviya et al. |
| D1,061,571 S | | 2/2025 | Arora |
| 12,242,491 B2 | | 3/2025 | Li |
| 12,248,962 B2 | | 3/2025 | Qu |
| 12,271,491 B2 | | 4/2025 | Cameron et al. |
| D1,078,763 S | | 6/2025 | Arora |
| D1,080,661 S | | 6/2025 | Shope |
| 12,333,412 B1 | | 6/2025 | Mazed |
| D1,091,608 S | | 9/2025 | Li et al. |
| D1,101,762 S | | 11/2025 | Gordonov et al. |
| D1,102,464 S | | 11/2025 | Varga et al. |
| D1,110,338 S | | 1/2026 | Goodrich et al. |
| 12,537,998 B1 | | 1/2026 | Perelli-Minetti et al. |

(56) References Cited

U.S. PATENT DOCUMENTS

| | | | |
|---|---|---|---|
| 2001/0042036 A1* | 11/2001 | Sanders ................. G06Q 40/04 705/36 R |
| 2002/0015480 A1 | 2/2002 | Daswani et al. |
| 2002/0023046 A1 | 2/2002 | Callahan |
| 2002/0042755 A1* | 4/2002 | Kumar ................. G06Q 10/087 705/26.4 |
| 2002/0059201 A1* | 5/2002 | Work ................... G06F 16/245 |
| 2002/0062262 A1 | 5/2002 | Vasconi |
| 2002/0087438 A1 | 7/2002 | Kunieda |
| 2002/0091991 A1 | 7/2002 | Castro |
| 2002/0120521 A1* | 8/2002 | Forth ................. G06Q 30/0631 705/26.5 |
| 2002/0138358 A1 | 9/2002 | Scheer |
| 2002/0165747 A1* | 11/2002 | Shriver ................. G06Q 10/06 705/301 |
| 2002/0188514 A1* | 12/2002 | Kritt ................... G06Q 10/087 705/23 |
| 2002/0198743 A1 | 12/2002 | Ariathurai |
| 2003/0009397 A1 | 1/2003 | Whitenack et al. |
| 2003/0018546 A1 | 1/2003 | Ayala |
| 2003/0028451 A1 | 2/2003 | Ananian |
| 2003/0050819 A1 | 3/2003 | Koenigbauer |
| 2003/0055700 A1* | 3/2003 | Hoffman .......... G06Q 10/06393 705/28 |
| 2003/0070061 A1 | 4/2003 | Wong |
| 2003/0074248 A1 | 4/2003 | Braud |
| 2003/0078846 A1 | 4/2003 | Burk |
| 2003/0084053 A1 | 5/2003 | Govrin |
| 2003/0130863 A1* | 7/2003 | Grey ........................ H04L 67/02 705/1.1 |
| 2003/0144858 A1* | 7/2003 | Jain ................... G06Q 10/0875 705/29 |
| 2003/0149608 A1 | 8/2003 | Kall |
| 2003/0163513 A1 | 8/2003 | Schaeck |
| 2003/0171962 A1* | 9/2003 | Hirth ................... G06Q 10/087 705/7.25 |
| 2003/0173403 A1 | 9/2003 | Vogler |
| 2003/0216950 A1* | 11/2003 | Chen ................... G06Q 10/087 705/26.81 |
| 2003/0229550 A1* | 12/2003 | DiPrima .............. G06Q 10/087 705/28 |
| 2003/0233264 A1 | 12/2003 | Jones |
| 2004/0006516 A1* | 1/2004 | Anagol-Subbarao ........................ G06Q 30/0633 705/26.8 |
| 2004/0019494 A1* | 1/2004 | Ridgeway .......... G06Q 30/0601 705/26.1 |
| 2004/0044565 A1 | 3/2004 | Kumar et al. |
| 2004/0044582 A1* | 3/2004 | Chowdhary ....... G06Q 30/0605 705/26.1 |
| 2004/0054800 A1 | 3/2004 | Shah et al. |
| 2004/0102981 A1 | 5/2004 | Schuh |
| 2004/0111304 A1* | 6/2004 | Meka ................... G06Q 10/10 705/7.22 |
| 2004/0111327 A1* | 6/2004 | Kidd ................... G06Q 10/087 705/26.5 |
| 2004/0267674 A1 | 12/2004 | Feng et al. |
| 2005/0049938 A1 | 3/2005 | Venkiteswaran |
| 2005/0138642 A1 | 6/2005 | Breh |
| 2005/0144082 A1 | 6/2005 | Coolman |
| 2005/0163951 A1 | 7/2005 | Oles |
| 2005/0262196 A1* | 11/2005 | Mueller ............. G06Q 30/0621 709/219 |
| 2005/0283410 A1 | 12/2005 | Gosko |
| 2006/0100889 A1 | 5/2006 | Gosko |
| 2006/0178918 A1* | 8/2006 | Mikurak ................. G06Q 10/06 705/7.31 |
| 2006/0277086 A1* | 12/2006 | Ball ................... G06Q 10/087 705/7.25 |
| 2006/0287932 A1 | 12/2006 | Wulteputte et al. |
| 2007/0033569 A1 | 2/2007 | Davidson |
| 2007/0050229 A1 | 3/2007 | Tatro et al. |
| 2007/0192216 A1 | 8/2007 | Arnold et al. |
| 2007/0203798 A1* | 8/2007 | Caballero et al. |
| 2007/0233574 A1* | 10/2007 | Koegler ................. G06Q 10/10 705/26.81 |
| 2007/0250545 A1 | 10/2007 | Surlaker |
| 2008/0052205 A1* | 2/2008 | Dolley ................... G06Q 10/06 705/28 |
| 2008/0133569 A1 | 6/2008 | Vu et al. |
| 2008/0228657 A1* | 9/2008 | Nabors ............... G06Q 50/188 705/80 |
| 2008/0270256 A1* | 10/2008 | Caballero .............. G06Q 40/12 705/26.81 |
| 2008/0319849 A1 | 12/2008 | Rapoport |
| 2009/0063305 A1* | 3/2009 | Kreifels .............. G06Q 10/087 705/28 |
| 2009/0063309 A1* | 3/2009 | Stephens ............... G06Q 10/06 705/29 |
| 2009/0112727 A1 | 4/2009 | Chi |
| 2009/0150663 A1 | 6/2009 | Perry |
| 2009/0171816 A1* | 7/2009 | del Rosario ....... G06Q 10/0875 705/28 |
| 2009/0177714 A1 | 7/2009 | Obermeyer et al. |
| 2010/0005085 A1 | 1/2010 | Millmore |
| 2010/0145831 A1 | 6/2010 | Esfandiari et al. |
| 2010/0161364 A1* | 6/2010 | Lokowandt .......... G06Q 10/087 705/28 |
| 2010/0211550 A1 | 8/2010 | Daniello |
| 2010/0250598 A1 | 9/2010 | Brauer et al. |
| 2011/0029345 A1* | 2/2011 | Kienzle ................. G06Q 10/06 700/107 |
| 2011/0156651 A1 | 6/2011 | Christensen |
| 2011/0238484 A1* | 9/2011 | Toumayan ......... G06Q 30/0641 709/225 |
| 2011/0313882 A1 | 12/2011 | Barthes |
| 2012/0036089 A1 | 2/2012 | Washington et al. |
| 2012/0071999 A1 | 3/2012 | Trammell et al. |
| 2012/0084215 A1 | 4/2012 | Trier |
| 2012/0209824 A1* | 8/2012 | Morimoto ............. G06F 16/958 707/705 |
| 2012/0226573 A1 | 9/2012 | Zakas |
| 2012/0226612 A1 | 9/2012 | Kurtis et al. |
| 2012/0232952 A1 | 9/2012 | Leonard |
| 2012/0259675 A1* | 10/2012 | Roehrs ................... G06Q 30/02 705/7.29 |
| 2012/0316935 A1 | 12/2012 | Feuerstin |
| 2012/0323933 A1 | 12/2012 | He |
| 2012/0330918 A1 | 12/2012 | Carey |
| 2012/0330973 A1 | 12/2012 | Ghuneim |
| 2013/0013346 A1* | 1/2013 | O'Connor .............. G06Q 40/08 705/4 |
| 2013/0041781 A1 | 2/2013 | Freydberg |
| 2013/0066745 A1 | 3/2013 | De Heer |
| 2013/0091033 A1* | 4/2013 | Goodman .......... G06Q 30/0621 705/26.5 |
| 2013/0117080 A1 | 5/2013 | Madsen |
| 2013/0159145 A1 | 6/2013 | Stevens |
| 2013/0166403 A1 | 6/2013 | Jin et al. |
| 2013/0191185 A1 | 7/2013 | Galvin |
| 2013/0191481 A1* | 7/2013 | Prevost ................... H04L 51/04 709/206 |
| 2013/0246215 A1 | 9/2013 | Faith et al. |
| 2013/0311271 A1* | 11/2013 | Agrawal ............... G06Q 30/02 705/14.71 |
| 2014/0025529 A1* | 1/2014 | Honeycutt ......... G06Q 30/0621 705/26.5 |
| 2014/0052491 A1 | 2/2014 | Narayanan |
| 2014/0052840 A1 | 2/2014 | Shukla |
| 2014/0059144 A1* | 2/2014 | Lehmann ............... G06Q 10/10 709/206 |
| 2014/0095265 A1* | 4/2014 | Steinman .......... G06Q 10/0637 705/7.36 |
| 2014/0095343 A1* | 4/2014 | Daniel ................... G06F 16/00 705/26.5 |
| 2014/0095488 A1 | 4/2014 | Malone |
| 2014/0122377 A1* | 5/2014 | Goodman ......... G06Q 10/06311 706/11 |
| 2014/0200965 A1* | 7/2014 | McConnell ........ G06Q 30/0206 705/7.35 |

(56) References Cited

U.S. PATENT DOCUMENTS

| | | |
|---|---|---|
| 2014/0222453 A1 | 8/2014 | Wills et al. |
| 2014/0222641 A1 | 8/2014 | Kober |
| 2014/0278804 A1 | 9/2014 | Lanxner |
| 2014/0279254 A1 | 9/2014 | Hastman |
| 2014/0322678 A1 | 10/2014 | Briancon et al. |
| 2014/0324530 A1* | 10/2014 | Thompson ......... G06Q 30/0201 |
| | | 705/7.29 |
| 2014/0324549 A1 | 10/2014 | Chelap et al. |
| 2014/0358723 A1 | 12/2014 | Ballaro et al. |
| 2014/0379422 A1 | 12/2014 | Chapman |
| 2015/0032526 A1 | 1/2015 | Calman et al. |
| 2015/0066570 A1 | 3/2015 | Hellen |
| 2015/0189014 A1 | 7/2015 | Grunenberger |
| 2015/0203673 A1 | 7/2015 | Alric |
| 2015/0281148 A1 | 10/2015 | Masterson et al. |
| 2015/0286645 A1 | 10/2015 | Sinha |
| 2015/0295766 A1* | 10/2015 | Dickey ................. H04L 43/106 |
| | | 709/221 |
| 2015/0302303 A1 | 10/2015 | Hakim |
| 2016/0092474 A1* | 3/2016 | Stojanovic ........... G06F 16/211 |
| | | 707/805 |
| 2016/0203319 A1 | 7/2016 | Coen et al. |
| 2016/0232624 A1 | 8/2016 | Goldberg et al. |
| 2016/0239855 A1 | 8/2016 | Feng |
| 2016/0267102 A1 | 9/2016 | Klein |
| 2016/0300144 A1* | 10/2016 | Santhanam ........... G06N 20/00 |
| 2016/0321344 A1 | 11/2016 | Aragone |
| 2016/0335345 A1 | 11/2016 | Wang |
| 2017/0006135 A1 | 1/2017 | Siebel |
| 2017/0017677 A1* | 1/2017 | Jolfaei ................ G06F 16/2358 |
| 2017/0017969 A1 | 1/2017 | Noursalehi et al. |
| 2017/0053558 A1* | 2/2017 | Zhou ................... G09B 19/0092 |
| 2017/0060641 A1 | 3/2017 | Ramaswamy |
| 2017/0063750 A1 | 3/2017 | Vardhan |
| 2017/0091327 A1 | 3/2017 | Bostic |
| 2017/0109675 A1* | 4/2017 | Hosny ................... G06Q 10/08 |
| 2017/0134516 A1 | 5/2017 | Gutman |
| 2017/0193412 A1 | 7/2017 | Easton |
| 2017/0193433 A1 | 7/2017 | Qin |
| 2017/0193527 A1* | 7/2017 | Backer ............... G06Q 30/0201 |
| 2017/0243465 A1 | 8/2017 | Bourne, Jr. |
| 2017/0255903 A1* | 9/2017 | Chowdhry ......... G06Q 10/0833 |
| 2017/0255987 A1* | 9/2017 | Bacharach ......... G06Q 30/0631 |
| 2017/0278173 A1* | 9/2017 | Ettl .................... G06Q 30/0631 |
| 2017/0286909 A1* | 10/2017 | Baynes ................ G06Q 10/067 |
| 2017/0287038 A1 | 10/2017 | Krasadakis |
| 2017/0364046 A1 | 12/2017 | Westrick, Jr. et al. |
| 2017/0364534 A1* | 12/2017 | Zhang ................... G06F 16/284 |
| 2017/0364796 A1 | 12/2017 | Wiebe |
| 2018/0005296 A1 | 1/2018 | Eades et al. |
| 2018/0024986 A1 | 1/2018 | Singh et al. |
| 2018/0136992 A1 | 5/2018 | Siebel |
| 2018/0143975 A1 | 5/2018 | Casal |
| 2018/0165604 A1 | 6/2018 | Minkin |
| 2018/0218322 A1 | 8/2018 | Bhargava |
| 2018/0240158 A1 | 8/2018 | Peng |
| 2018/0285790 A1* | 10/2018 | Huynh ............... G06Q 30/0206 |
| 2018/0288363 A1 | 10/2018 | Amengual Galdon |
| 2018/0308151 A1 | 10/2018 | Ainsworth, III |
| 2018/0314925 A1 | 11/2018 | Gauci |
| 2018/0315141 A1* | 11/2018 | Hunn ...................... G06F 9/547 |
| 2018/0332102 A1* | 11/2018 | Sheidaei ............... G06Q 10/20 |
| 2018/0336514 A1 | 11/2018 | Ranjanghatmuralidhar et al. |
| 2018/0337798 A1 | 11/2018 | Ilic |
| 2018/0343491 A1 | 11/2018 | Loheide et al. |
| 2018/0349793 A1 | 12/2018 | Triolo et al. |
| 2019/0034838 A1 | 1/2019 | Canis |
| 2019/0050688 A1 | 2/2019 | Iyer |
| 2019/0095992 A1 | 3/2019 | Soh |
| 2019/0102162 A1 | 4/2019 | Pitre et al. |
| 2019/0102418 A1* | 4/2019 | Vasudevan .............. G06F 16/27 |
| 2019/0102753 A1 | 4/2019 | Harrison |
| 2019/0114689 A1* | 4/2019 | Wang ................. G06Q 30/0224 |
| 2019/0147400 A1 | 5/2019 | Knight |
| 2019/0149725 A1 | 5/2019 | Adato et al. |
| 2019/0163985 A1 | 5/2019 | Wang |
| 2019/0192074 A1* | 6/2019 | Smets ................... G16H 50/20 |
| 2019/0215424 A1 | 7/2019 | Adato et al. |
| 2019/0220914 A1 | 7/2019 | Flannery et al. |
| 2019/0243836 A1 | 8/2019 | Nanda et al. |
| 2019/0251457 A1* | 8/2019 | Byrnes ................. H04L 67/566 |
| 2019/0286759 A1* | 9/2019 | Wilkins ................... G06N 3/08 |
| 2019/0303487 A1 | 10/2019 | Mehta |
| 2019/0303579 A1 | 10/2019 | Reddy |
| 2020/0026552 A1 | 1/2020 | Zhang |
| 2020/0045519 A1 | 2/2020 | Raleigh et al. |
| 2020/0073642 A1 | 3/2020 | Koryakin |
| 2020/0117757 A1 | 4/2020 | Yanamandra |
| 2020/0134683 A1* | 4/2020 | Boren ................... G06F 16/904 |
| 2020/0143313 A1 | 5/2020 | Ohlsson et al. |
| 2020/0184416 A1 | 6/2020 | Javaheri |
| 2020/0210947 A1* | 7/2020 | Devarakonda ... G06Q 10/06393 |
| 2020/0219159 A1* | 7/2020 | Choudhary ........... G06F 3/0484 |
| 2020/0235941 A1 | 7/2020 | Nguyen |
| 2020/0265512 A1* | 8/2020 | James ................... G06F 18/214 |
| 2020/0272981 A1 | 8/2020 | Kirkegaard |
| 2020/0279200 A1* | 9/2020 | Makhija ................. G06N 3/08 |
| 2020/0320095 A1 | 10/2020 | Haase |
| 2020/0327252 A1 | 10/2020 | Mcfall |
| 2020/0334608 A1 | 10/2020 | Ramanathan et al. |
| 2020/0349624 A1* | 11/2020 | Ramanathan ........ G06Q 10/087 |
| 2020/0394398 A1* | 12/2020 | Pamarthi .............. G06F 16/345 |
| 2020/0394455 A1 | 12/2020 | Lee |
| 2021/0012329 A1* | 1/2021 | Gandhi ............... G06Q 20/027 |
| 2021/0012358 A1 | 1/2021 | Wical |
| 2021/0036889 A1 | 2/2021 | Jain et al. |
| 2021/0065134 A1 | 3/2021 | Chhabra |
| 2021/0065294 A1 | 3/2021 | Trevathan |
| 2021/0117384 A1 | 4/2021 | Leite Pinheiro De Paiva |
| 2021/0125144 A1* | 4/2021 | Liu ........................ G06Q 50/04 |
| 2021/0133788 A1 | 5/2021 | Jacobs |
| 2021/0133850 A1* | 5/2021 | Ayush ...................... G06N 3/08 |
| 2021/0142385 A1 | 5/2021 | Alahmady |
| 2021/0144250 A1 | 5/2021 | Mahar |
| 2021/0158259 A1* | 5/2021 | Evans ................... G06Q 10/04 |
| 2021/0166179 A1 | 6/2021 | Pande |
| 2021/0166251 A1 | 6/2021 | Mehmanpazir et al. |
| 2021/0182730 A1 | 6/2021 | Clarke |
| 2021/0182746 A1 | 6/2021 | Muthukrishnan |
| 2021/0201346 A1 | 7/2021 | Dejardins |
| 2021/0226573 A1 | 7/2021 | George et al. |
| 2021/0233129 A1* | 7/2021 | Bikumala .......... G06Q 10/0875 |
| 2021/0241299 A1 | 8/2021 | Ramini et al. |
| 2021/0241301 A1* | 8/2021 | Christensen ....... G06Q 30/0603 |
| 2021/0241337 A1* | 8/2021 | Bikumala ............... G06F 40/30 |
| 2021/0248151 A1 | 8/2021 | Kadel |
| 2021/0269244 A1 | 9/2021 | Ahmann |
| 2021/0287275 A1 | 9/2021 | Karlan-Mason |
| 2021/0303420 A1 | 9/2021 | Willoughby |
| 2021/0334871 A1 | 10/2021 | Quinn et al. |
| 2021/0350429 A1 | 11/2021 | Gangadarappa |
| 2021/0350432 A1 | 11/2021 | Kushner |
| 2021/0357959 A1 | 11/2021 | Cella et al. |
| 2021/0377203 A1 | 12/2021 | Hou |
| 2021/0378779 A1* | 12/2021 | Lenzenhuber ..... A61B 17/1615 |
| 2021/0383316 A1 | 12/2021 | Mimassi |
| 2021/0397989 A1* | 12/2021 | Mayers ................. G06N 20/00 |
| 2022/0019204 A1 | 1/2022 | Maury |
| 2022/0051183 A1 | 2/2022 | Franzo |
| 2022/0058723 A1 | 2/2022 | Swett et al. |
| 2022/0067085 A1 | 3/2022 | Nihas |
| 2022/0114509 A1 | 4/2022 | Pinheiro |
| 2022/0116470 A1* | 4/2022 | Sethi ..................... H04L 67/564 |
| 2022/0122134 A1 | 4/2022 | Hoffman et al. |
| 2022/0122142 A1 | 4/2022 | Cao |
| 2022/0129803 A1* | 4/2022 | Bikumala ............. G06F 16/906 |
| 2022/0156275 A1 | 5/2022 | Burke |
| 2022/0197246 A1 | 6/2022 | Cella |
| 2022/0198431 A1 | 6/2022 | Foster, Jr. |
| 2022/0245008 A1* | 8/2022 | Deljavan Farshi ..... G06F 9/542 |
| 2022/0245115 A1 | 8/2022 | Kulkarni et al. |
| 2022/0245727 A1 | 8/2022 | Roll et al. |
| 2022/0253775 A1 | 8/2022 | Burkhead et al. |
| 2022/0270160 A1 | 8/2022 | Sadhankar |

(56) References Cited

U.S. PATENT DOCUMENTS

2022/0284459 A1    9/2022    Kwok et al.
2022/0292160 A1    9/2022    Mehta et al.
2022/0309436 A1    9/2022    Evans
2022/0319504 A1    10/2022    Owhadi
2022/0327119 A1    10/2022    Gasper
2022/0327597 A1    10/2022    Griesmer
2022/0329595 A1    10/2022    Wynter
2022/0357971 A1    11/2022    Feliciano
2022/0373346 A1    11/2022    Abhishek
2022/0374737 A1    11/2022    Dhara
2022/0383400 A1    12/2022    Wade
2022/0405775 A1*    12/2022    Siebel ............... G06Q 30/0202
2023/0005330 A1    1/2023    Hartwig et al.
2023/0012041 A1    1/2023    Holloran
2023/0012650 A1    1/2023    Aggarwal
2023/0030234 A1    2/2023    Fichuk et al.
2023/0030262 A1    2/2023    Springer
2023/0032447 A1    2/2023    Mackie
2023/0051934 A1    2/2023    Devan et al.
2023/0055677 A1    2/2023    Dhelaria
2023/0059565 A1    2/2023    Ravindran et al.
2023/0064747 A1*    3/2023    Inoue Sardenberg .......................
                                                   G06Q 30/0206
2023/0067777 A1    3/2023    Hadar
2023/0074782 A1    3/2023    Prasad
2023/0075794 A1*    3/2023    Muttreja ............... G06F 16/951
2023/0091441 A1    3/2023    Go
2023/0102048 A1*    3/2023    Cella ...................... G06N 10/80
                                                   700/248
2023/0113006 A1    4/2023    Liu
2023/0125533 A1    4/2023    Estes
2023/0162258 A1*    5/2023    Das Gupta ......... G06Q 30/0633
                                                   705/26.7
2023/0185878 A1    6/2023    Makhija et al.
2023/0206251 A1    6/2023    Acharya et al.
2023/0206265 A1    6/2023    Girija
2023/0214773 A1    7/2023    Ha
2023/0214854 A1    7/2023    Michael
2023/0214864 A1    7/2023    Colombier
2023/0222536 A1    7/2023    Hoang
2023/0259521 A1    8/2023    Alfons
2023/0316377 A1*    10/2023    Bacharach ......... G06Q 30/0631
                                                   705/26.7
2023/0325900 A1    10/2023    Edwards
2023/0342344 A1    10/2023    Brown
2023/0350963 A1*    11/2023    Saad ................... G06F 16/9038
2023/0359161 A1    11/2023    O'Rourke et al.
2023/0367696 A1    11/2023    Liu
2023/0385288 A1    11/2023    Kulkarni et al.
2023/0394426 A1*    12/2023    Bauders ............... G06Q 10/087
2023/0410095 A1    12/2023    Cella
2023/0418980 A1    12/2023    Abrougui
2023/0419387 A1    12/2023    Ballaro
2024/0022492 A1    1/2024    Nanda
2024/0062099 A1    2/2024    Crockett
2024/0070750 A1*    2/2024    Smith, Jr. .......... G06Q 30/0635
2024/0095788 A1    3/2024    Vaishnav
2024/0095789 A1*    3/2024    Vaishnav ........... G06Q 30/0283
2024/0106828 A1    3/2024    Jain
2024/0107122 A1    3/2024    Akhoury
2024/0118702 A1    4/2024    Cella
2024/0144170 A1    5/2024    Kim
2024/0169410 A1    5/2024    Zhao
2024/0184650 A1    6/2024    O'Kelley
2024/0211828 A1    6/2024    Iwamoto
2024/0232941 A1    7/2024    Vajge
2024/0248919 A1    7/2024    Kumar
2024/0266010 A1    8/2024    Adhikari et al.
2024/0281419 A1    8/2024    Alfaras
2024/0281423 A1    8/2024    Perrin
2024/0311853 A1    9/2024    Rendahl et al.
2024/0330983 A1*    10/2024    Isaacs ............... G06Q 30/0639
2024/0354423 A1    10/2024    Mardikar
2024/0354686 A1    10/2024    Hegde
2024/0354867 A1    10/2024    Young et al.

2024/0362576 A1*    10/2024    Rajagopal .......... G06Q 10/0838
2024/0370902 A1*    11/2024    Miglani ................. G16H 40/00
2024/0372856 A1    11/2024    Black et al.
2024/0419678 A1    12/2024    Sharma
2024/0420012 A1    12/2024    Austin
2024/0427789 A1    12/2024    Sahoo
2024/0428166 A1    12/2024    Sahoo et al.
2024/0428318 A1    12/2024    Sahoo
2025/0005479 A1    1/2025    Sahoo
2025/0036648 A1    1/2025    Hunter et al.
2025/0047663 A1    2/2025    Brennan et al.
2025/0062949 A1    2/2025    Nimmagadda et al.
2025/0077601 A1    3/2025    Liu
2025/0139656 A1    5/2025    Durvasula
2025/0259032 A1    8/2025    Crabtree et al.
2025/0301489 A1    9/2025    Gabizon et al.
2025/0355656 A1    11/2025    Khalil et al.

FOREIGN PATENT DOCUMENTS

CN              108122157  A        6/2018
CN              110570245  A        12/2019
CN              118536118  A    *    8/2024    ............... G06F 8/75
JP              2001005863  A        1/2001
JP              2002108668  A        4/2002
JP              2004538542  A        12/2004
JP              2020514860  A        5/2020
JP              2020514860  A5        2/2021
JP              2021532444  A        11/2021
JP              2022175317  A        11/2022
JP              2023508188  A        3/2023
KR              20070057806  A        6/2007
WO              9425161  A1        11/1994
WO              200233581  A2        4/2002
WO              02063530  A2        8/2002
WO          WO-2004104739  A2    *    12/2004    ............. G06Q 10/06
WO              2006026673  A2        3/2006
WO          WO-2010107730  A1    *    9/2010    ............. G06Q 30/06
WO              2010151368  A2        12/2010
WO          WO-2012019097  A2    *    2/2012    ............. G06Q 30/02
WO          WO-2013181736  A1    *    12/2013    ......... G06Q 10/0633
WO          WO-2014060050  A1    *    4/2014    ....... G06F 16/24564
WO              2016013972  A1        1/2016
WO              2016118979  A2        7/2016
WO              2018116252  A1        6/2018
WO          WO-2018231850  A1    *    12/2018    .............. H04W 4/38
WO          WO-2019157399  A1    *    8/2019    .............. G06F 9/54
WO              2021171250  A1        9/2021
WO              2021262530  A1        12/2021
WO              2022008567  A1        1/2022
WO              2022132040  A1        6/2022
WO              2023026313  A1        3/2023
WO              2023174562  A1        9/2023
WO          WO-2024073505  A1    *    4/2024    .......... G06Q 10/067
WO              2024226421  A1        10/2024
WO              2024233674  A2        11/2024

OTHER PUBLICATIONS

Zhamak Dehghani, "How to move beyond a monolithic data lake to a distributed data mesh", published by martinfowler.com on May 20, 2019 (Year: 2019).*
Sutton, "a reinforcement learning and synthetic data approach to mobile notification management", published by Momm in 2019 ( Year: 2019).*
Basumallic, "What is a Software Engine? Types, Applications, and Importance." Oct. 7, 2022. URL Link: <https://www.spiceworks. com/tech/devops/articles/what-is-software-engine/>.
Holzer et al., "Developing a Framework for Linking Design Intelligence from Multiple Professions in the AEC Industry," 2007. URL Link: <https://link.springer.com/content/pdf/10.1007/978-1-4020-6528-6_23.pdf>.
PCMag. "engine" definition. Dec. 1, 2020 snapshot via Archive.org URL Link: <https://www.pcemag.com/encyclopedia/term/engine>.
Techopedia. "Engine" definition. Oct. 19, 2012. URL Link: <https://www.techopedia.com/definition/24155/engine>.

(56)          References Cited

OTHER PUBLICATIONS

Biswas S., et al., "A Proposed Architecture for Big Data Driven Supply Chain Analytics," ICFAI University Press (IUP) Journal of Supply Chain Management, 2016, vol. 13, No. 3, pp. 7-34 (24 Pages), Retrieved from URL: https://arxiv.org/abs/1705.04958.

European Search Report for European Application No. 24186933, dated Nov. 25, 2024, 09 Pages.

Extended European Search Report for European Application No. 24184819.1, dated Nov. 27, 2024, 10 Pages.

Extended European Search Report for European Application No. 24187943.6, dated Nov. 19, 2024, 8 Pages.

Extended European Search Report for European Application No. 24187967.5, dated Nov. 25, 2024, 8 Pages.

Machado I.A., et al., "Data Mesh: Concepts and Principles of a Paradigm Shift in Data Architectures," Procedia Computer Science, Amsterdam, NL, Jan. 10, 2022, vol. 196, pp. 263-271, DOI: 10.1016/j.procs.2021.12.013, ISSN: 1877-0509, XP093050267, Retrieved from URL: https://www.sciencedirect.com/science/article/pii/S1877050921022365.

Office Action for Japanese Application No. 2024-101794, dated Sep. 13, 2024, 21 Pages.

Office Action for Japanese Application No. 2024-108629, dated Oct. 29, 2024, 10 Pages.

Office Action for Japanese Application No. 2024-112073, dated Oct. 15, 2024, 9 Pages.

Suzumura K., "Latest IT Trends by Field: Inter-System Integration: The Key Lies in the Use of Open Technology, Performance and Reliability," Nikkei Computer, Japan, Nikkei BP, Sep. 23, 2002, No. 557, pp. 28-29 (6 Pages), ISSN 0285-4619.

Wikipedia: "Data Mesh," May 25, 2023, 3 Pages, XP093199672, Retrieved from URL: https://en.Wikipedia.org/w/index.php?title=Data_mesholdid=1157039904.

Agarwal, Saloni et al., "Improving Bundles Recommendation Coverage in Sparse Product Graphs," WWW 22 Companion, 2022, all pgs.

Carlos, Rafael et al., "Framework for Continuous Agile Technology Roadmap Updating," Emeraldinsight.com, 2017, all pages.

Decision of Refusal issued in Japanese Patent Application No. 2024-108629, dated Apr. 11, 2025, 5 pgs.

English Translation of Decision of Refusal issued in Japanese Patent Application No. 2024-108629, dated Apr. 11, 2025, 7 pgs.

Office Action issued in Japanese Patent Application No. 2024-101794, dated May 16, 2025, 6 pgs.

English Translation of Office Action issued in Japanese Patent Application No. 2024-101794, dated May 16, 2025, 5 pgs.

European Search Report issued in European Patent Application No. 25163362.4 , dated May 2, 2025, 10 pgs.

European Search Report issued in European Patent Application No. EP25156175.9, dated Mar. 13, 2025.

Examination Report issued in Australian Patent Application No. 2024204660, dated Apr. 16, 2025, 4 pgs.

Examination Report issued in Australian Patent Application No. 20244204340, dated 2025-02-28, 5 pgs.

Examination Report issued in Australian Patent Application No. 2025200528, dated 2025-03-06, 5 pgs.

Examination Report issued in Australian Patent Application No. 2025200535, dated 2025-04-07, 7 pgs.

Examination Report issued in Australian Patent Application No. 2025200793, dated 2025-04-01, 9 pgs.

Examination Report issued in Australian Patent Application No. 2025201639, dated Apr. 30, 2025, 6 pgs.

Examination Report issued in Australian Patent Application No. 2025201740, dated Mar. 18, 2025, 5 pgs.

Kohut, Yurii et al., "Recommendation System for Purchasing Goods based on the Decision Tree Algorithm," Advances in Cyber-Physical Systems, vol. 6, No. 2, 2021, 7 pgs.

Palo, Joonas, "Product Roadmapping Tool and Process Unification as part of a Global End-to-End Repeatability Operating Model Development," Haaga-helia, 2023, all pgs.

Sun, Zhu et al., "Revisiting Bundle Recommendation: Datasets, Tasks, Challenges and Opportunities for Intent Aware Product Bundling," Association for Computing Machinery, Spain, SIGIR 2022, 12 pgs.

Search Report from European Patent Application No. 25154230.4, dated Jul. 10, 2025, 10 pgs.

International Search Report and Written Opinion for International Application No. PCT/US2024/037624, dated Oct. 28, 2024, 9 Pages.

Johnson, Renee, "Everything you Need to Know About Global Distribution System", Mar. 2, 2022, itilite. com, 6 pages (Year: 2022).

Channelpro Network: "Ingram Micro's New Xvantage Mobile Application is Simplifying How the IT Channel Works," Ingram Macro Inc, Dec. 20, 2023, 2 Page, [Retrieved on Sep. 18, 2025] Retrieved from URL: https://www.channelpronetwork.com/2023/12/20/ingram-micros-new-xvantage-mobile-application-is-simplifying-how-the-it-channel- works/.

Costa C., "Data Mesh: Concepts and Principles of a Paradigm Shift in Data Architectures," published by ScienceDirect in 2022 (Year: 2022), 9 pages.

Dehghani Z., "Data Mesh Principles and Logical Architecture", published by martinfowler.com on May 20, 2019 (Year: 2019), 9 pages.

Dey D., et al., "Appraise: A Governance Framework for Innovation with Artificial Intelligence Systems," ACM, 2024, 13 Pages.

Extended European Search Report for European Application No. 25154210.6, dated Jun. 11, 2025, 09 Pages.

Extended European Search Report for European Application No. 25161920.1, dated Jul. 24, 2025, 15 Pages.

Gately E., "Ingram Micro Debuts Xvantage Mobile App," Channel Futures, Dec. 20, 2023, 1 Page, [Retrieved on Sep. 2, 2025] Retrieved from URL: https:// www.channelfutures.com/channel-sales-marketing/ingram-micro-debuts-xvantage-mobile-app.

He Z., et al., "Enhancing Web Accessibility: Automated Detection of Issues with Generative AI," Proceedings of the ACM on Software Engineering, Jul. 2025, vol. 2, No. FSE, Article FSE101, pp. 1-24.

Ingram Industries Inc: "Ingram Micro," Registered Trademark U.S. Appl. No. 86/365,487, filed May 30, 2017, 3 Pages, [Retrieved on Aug. 13, 2025] Retrieved from URL: https://tsdr.USPTO.gov/#caseNumber=86365487&caseSearchType=US_APPLICATION &caseType=DEFAULT&searchType=statusSearch.

Kundu S., et al., "Detecting Functional Safety Violations in Online AI Accelerators," IEEE, 2022, pp. 1-4.

Mailparser, "Enter Mailparser: Your Solution for Data Entry," 2024, 7 Pages, [Retrieved on Dec. 2, 2025] Retrieved from URL: https:// mailparser.io/email-to-erp.

Robert J.E., "Applying Generative AI to Detect Document Incompleteness, Inconsistencies, and Discrepancies," ACM, FSE Companion'25, Jun. 23-28, 2025, pp. 1381-1385.

Sryheni S., "Introduction to Depth First Search Algorithm (DFS)," Baeldung.com, Mar. 24, 2023, 6 Pages.

Wolfart D., et al., "Modernizing Legacy Systems with Microservices: A Roadmap," Association for Computing Machinery, Jun. 21-23, 2021, 11 Pages.

YOUTUBE.COM: "Welcome to Xvantage Mobile-Your Anywhere, Anytime App," Ingram Micro USA, Oct. 24, 2023, 3 Pages, [Retrieved on Aug. 13, 2025] Retrieved from URL: https://www.youtube.com/watchv=QyZOeBLJODM.

Pfefferle, J., " Moving from data lakes to data mesh", Oct. 18, 2022, medium.com, 22 pages (Year: 2022).

U.S. Appl. No. 15/484,594, filed Oct. 11, 2018,Kirk G. Krappe.

European Search Report for European Application No. 25201138.2, dated Jan. 7, 2026, 12 Pages.

Rahm E., et al., "A survey of approaches to automatic schema matching," the VLDB Journal, vol. 10, No. 4, 2001, pp. 334-350.

Sahay T., et al., "Schema Matching using Machine Learning," 2019, 07 Pages, arXiv:1911.1154 [5].

* cited by examiner

400

| SPoG UI 405 |
| AI Module 460 |
| Alert Management Module 430 |
| Alert Analytics Module 440 |
| Alert Customization/Recommendation Engine 450 |
| Asset Management Module 470 |
| Data Mesh 410 |

System of Records 280

<u>500</u>

SPoG UI 505

| CIM  Module 510 | Performance & Insights 545 |
| AI Module 520 | Predictive Analysis Module 550 |
| Interface Display Module 525 | Recommendation System Module 555 |
| Personalized Interaction Module 530 | Notification Module 560 |
| Document Hub 535 | Onboarding Module 565 |
| Catalog Management Module 540 | Communications Module 570 |

RTDM Module 515

System of Records 280

900

Data Ingestion/Processing 901

Transmit Data To Event Adapter 902

Transmit to Notification Engine 903

Notification Trigger 904

Generate Notification Content 905

Transmit Content tot Distribution Module 906

Multi-Channel Notification Dissemination 907

Notification Receipt by End Users 908

1000

SYSTEMS AND METHODS FOR ALERTS AND NOTIFICATIONS IN AN ADVANCED DISTRIBUTION PLATFORM

CROSS REFERENCE TO RELATED APPLICATIONS

This application is a Continuation-In-Part (CIP) of U.S. patent application Ser. No. 18/341,714, filed on Jun. 26, 2023 and U.S. patent application Ser. No. 18/349,836, filed on Jul. 10, 2023. This application also claims the benefit of U.S. Provisional Application No. 63/513,073, filed on Jul. 11, 2023; U.S. Provisional Application No. 63/513,078, filed on Jul. 11, 2023; U.S. Provisional Application No. 63/515, 075, filed on Jul. 21, 2023; and U.S. Provisional Application No. 63/515,076, filed on Jul. 21, 2023. Each of these applications is incorporated herein by reference in their entireties.

BACKGROUND

Traditional ordering processes in distribution and supply-chain platforms are marred with inefficiencies, delays, and inaccuracies. In the conventional landscape, multiple systems and vendors usually perform each activity independently, from creating a bill of materials to registering deals, applying pricing, generating quotes, and submitting orders. This approach leads to operational inefficiencies and a heightened likelihood of errors.

Enterprise Resource Planning (ERP) systems have served as the mainstay in managing business processes, including distribution and supply chain. These systems act as central repositories where different departments such as finance, human resources, and inventory management can access and share real-time data. While ERPs are comprehensive, they present several challenges in today's complex distribution and supply chain environment. One of the primary challenges is data fragmentation. Data silos across different departments or even separate ERP systems make real-time visibility difficult to achieve. Users lack a comprehensive view of key distribution and supply chain metrics, which adversely affects decision-making processes.

Moreover, ERP systems often do not offer effective data integration capabilities. Traditional ERP systems are not designed to integrate efficiently with external systems or even between different modules within the same ERP suite. This design results in a cumbersome and error-prone manual process to transfer data between systems and affects the flow of information throughout the supply chain. Data inconsistencies occur when information exists in different formats across systems, hindering accurate data analysis and leading to uninformed decision-making.

Data inconsistency presents another challenge. When data exists in different formats or units across departments or ERPs, standardizing this data for meaningful analysis becomes a painstaking process. Businesses often resort to time-consuming manual processes for data transformation and validation, which further delays decision-making. Additionally, traditional ERP systems often lack the capabilities to handle large volumes of data effectively. These systems struggle to provide timely insights for operational improvements, particularly problematic for businesses dealing with complex and expansive distribution and supply chain networks.

Data security is another concern, especially considering the sensitive nature of supply chain data, which includes customer details, pricing, and contracts. Ensuring compli-ance with global regulations on data security and governance adds an additional layer of complexity. Traditional ERP systems often lack robust security features sufficient to adapt to the continually evolving landscape of cybersecurity threats and compliance requirements.

BRIEF SUMMARY OF THE INVENTION

Automated Alerts and Notifications processes are designed to address inefficiencies in the technology distribution industry by integrating various systems and activities into a unified interface. This integration enables the management and dissemination of information-from operational alerts to service updates-across a technology distribution platform. The transformation into this unified communication model facilitates the entire notification management process, enhancing efficiency in activities like user interaction, dynamic content customization, and subscription notification management. The platform ensures data security and compliance while effectively integrating and accelerating notification processes.

In the global distribution industry, challenges such as inefficient communication channels, real-time updates, and the transition to more user-centered models necessitate innovative solutions. Traditional notification methods are increasingly insufficient, particularly with shifts in user engagement and regulatory requirements. By integrating functionalities for real-time alerts, user interaction management, and visibility into system performance, the platform supports a shift from traditional communication methods to a flexible, user-centric notification model.

According to some embodiments, an Alert Optimization module can be configured to incorporate algorithms to optimize notification content and delivery based on real-time data and user preferences. The system includes a module that, integrated with Real-Time Data Mesh (RTDM) and Single Pane of Glass User Interface (SPoG UI), optimizes the dissemination of information. Using advanced algorithms, it adapts notifications based on real-time system performance data and user interaction patterns, enhancing the relevance and timeliness of communications.

In a non-limiting example, a User Engagement Recommendation Engine employs algorithms to offer personalized notification options to users. A Content Customization Engine, using models like multi-variable linear regression or Random Forest, predicts and adjusts notification content based on actual user engagement, system events, and individual user settings.

In an embodiment, a Notification Management and Real-Time Interaction module(s) operably connected with the RTDM and SPoG UI manages the lifecycle of user notifications. The module(s) optimize notification delivery based on real-time data, using algorithms to dynamically adjust content and user interaction options. The system includes a content engine for message customization, adapting to variables like user feedback and system status.

In some embodiments, the system enables users to personalize their notification settings with a single click via the SPoG UI. It includes a module for checking user preferences and aggregating interaction options based on current system status, facilitating the notification management process.

Additionally, or alternatively, the system employs validation algorithms, such as support vector machines, to ensure the precision of notification delivery. It synchronizes real-time data from various sources, ensuring consistent and up-to-date information across the notification system.

Embodiments disclosed herein integrate multiple systems, automate processes, and validate to automate the management of information across a technology distribution platform. By implementing intelligent rules and validations, the system efficiently executes complex tasks, reducing time and errors associated with manual notification management. The system's adaptability ensures it remains current and evolves to meet operational and user demands.

The system uses data-driven methods to automate the customization and management of notification packages based on user interaction patterns. This includes assembling various alerts and updates into coherent communication flows that align with individual user behaviors and preferences. The system generates user profiles based on comprehensive data analysis, encompassing aspects like digital engagement and response patterns. This data informs the customization of notification packages that meet specific user requirements in areas such as system updates, service alerts, and operational changes.

The system incorporates advanced algorithms to analyze user data, including historical interaction patterns, to discern preferences and anticipate communication needs. This facilitates the creation of notification packages that are highly relevant and engaging. Automated notification bundling integrates information and updates from different system components, ensuring each communication package meets the user's informational and interaction needs. Automated Alerts and Notifications generation can include combinations like system alerts with compatible service updates and operational changes, designed to enhance user awareness and operational efficiency.

Single Pane of Glass

The Single Pane of Glass (SPoG) can provide a comprehensive solution that is configured to address these multifaceted challenges. It can be configured to provide a holistic, user-friendly, and efficient platform that facilitates the distribution process.

According to some embodiments, SPoG can be configured to address supply chain and distribution management by enhancing visibility and control over the supply chain process. Through real-time tracking and analytics, SPoG can deliver valuable insights into inventory levels and the status of goods, ensuring that the process of supply chain and distribution management is handled efficiently.

According to some embodiments, SPoG can integrate multiple touchpoints into a single platform to emulate a direct consumer channel into a distribution platform. This integration provides a unified direct channel for consumers to interact with distributors, significantly reducing the complexity of the supply chain and enhancing the overall customer experience.

SPoG offers an innovative solution for improved inventory management through advanced forecasting capabilities. These predictive analytics can highlight demand trends, guiding companies in managing their inventory more effectively and mitigating the risks of stockouts or overstocks.

According to some embodiments, SPoG can include a global compliance database. Updated in real-time, this database enables distributors to stay abreast with the latest international laws and regulations. This feature significantly reduces the burden of manual tracking, ensuring smooth and compliant cross-border transactions.

According to some embodiments, to facilitate SKU management and product localization, SPoG integrates data from various OEMs into a single platform. This not only ensures data consistency but also significantly reduces the potential for errors. Furthermore, it provides capabilities to manage and distribute localized SKUs efficiently, thereby aligning with specific market needs and requirements.

According to some embodiments, SPoG is its highly configurable and user-friendly platform. Its intuitive interface allows users to easily access and purchase technology, thereby aligning with the expectations of the new generation of tech buyers.

Moreover, SPoG's advanced analytics capabilities offer invaluable insights that can drive strategy and decision-making. It can track and analyze trends in real-time, allowing companies to stay ahead of the curve and adapt to changing market conditions.

SPoG's flexibility and scalability make it a future-proof solution. It can adapt to changing business needs, allowing companies to expand or contract their operations as needed without significant infrastructural changes.

SPoG's innovative approach to resolving the challenges in the distribution industry makes it an invaluable tool. By enhancing supply chain visibility, facilitating inventory management, ensuring compliance, simplifying SKU management, and delivering a superior customer experience, it offers a comprehensive solution to the complex problems that have long plagued the distribution sector. Through its implementation, distributors can look forward to increased efficiency, reduced errors, and improved customer satisfaction, leading to sustained growth in the ever-evolving global market.

Real-Time Data Mesh (RTDM)

The platform can be include implementation(s) of a Real-Time Data Mesh (RTDM), according to some embodiments. RTDS offers an innovative solution to address these challenges. RTDM, a distributed data architecture, enables real-time data availability across multiple sources and touchpoints. This feature enhances supply chain visibility, allowing for efficient management and enabling distributors to handle disruptions more effectively.

RTDM's predictive analytics capability offers a solution for efficient inventory control. By providing insights into demand trends, it aids companies in managing inventory, reducing risks of overstocking or stockouts.

RTDM's global compliance database, updated in real-time, ensures distributors are current with international regulations. It significantly reduces the manual tracking burden, enabling cross-border transactions.

The RTDM also simplifies SKU management and localization by integrating data from various OEMs, ensuring data consistency and reducing error potential. Its capabilities for managing and distributing localized SKUs align with specific market needs efficiently.

The RTDM enhances customer experience with its intuitive interface, allowing easy access and purchase of technology, meeting the expectations of the new generation of tech buyers.

Advantages of SPoG and RTDM Integration

Integrating SPoG platform with the RTDM provides a myriad of advantages. Firstly, it offers a holistic solution to the longstanding problems in the distribution industry. With the RTDM's capabilities, SPoG can enhance supply chain visibility, facilitate inventory management, ensure compliance, simplify SKU management, and deliver a superior customer experience.

The real-time tracking and analytics offered by RTDM improve SPoG's ability to manage the supply chain and inventory effectively. It provides accurate and current information, enabling distributors to make informed decisions quickly.

Integrating SPoG with RTDM also ensures data consistency and reduces errors in SKU management. By providing a centralized platform for managing data from various OEMs, it simplifies product localization and helps to align with market needs.

The global compliance database of RTDM, integrated with SPoG, facilitates and compliant cross-border transactions. It also reduces the burden of manual tracking, saving significant time and resources.

In some embodiments, a distribution platform incorporates SPoG and RTDM to provide an improved and comprehensive distribution system. The platform can leverage the advantages of a distribution model, addresses its existing challenges, and positions it for sustained growth in the ever-evolving global market.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
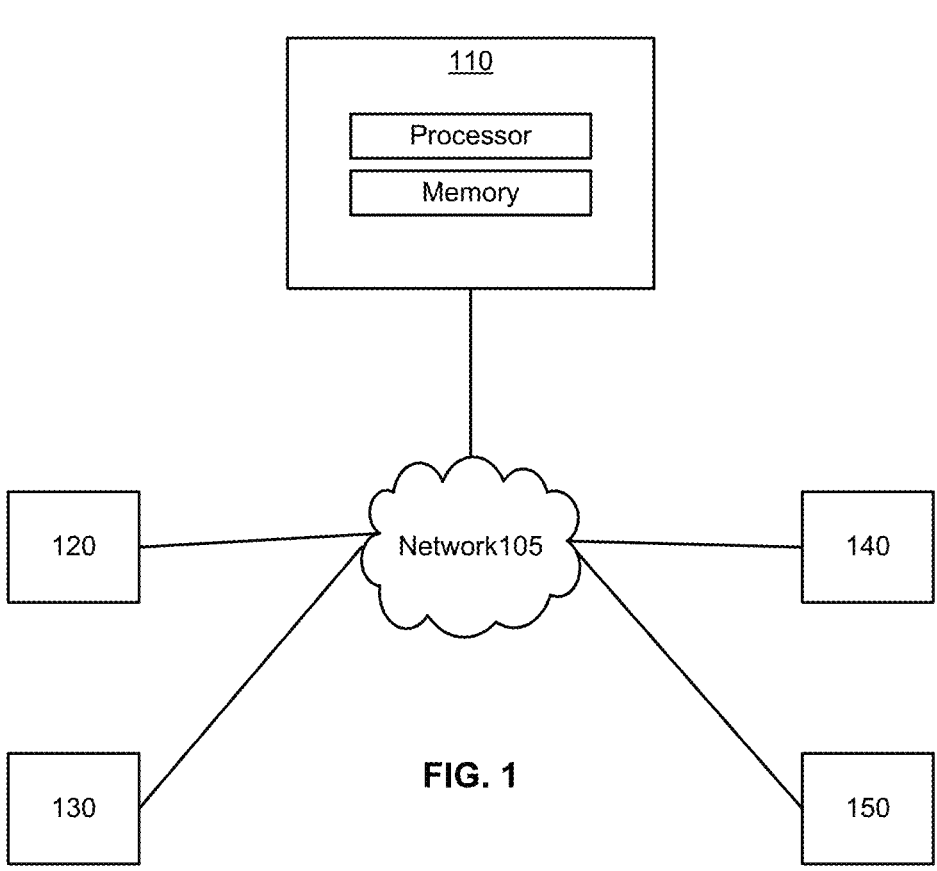
FIG. 1 illustrates one embodiment of an operating environment of a distribution platform, referred to as System in this embodiment.

FIG. 1 illustrates an operating environment 100 of a distribution platform, referred to as System 110 in this embodiment. System 110 operates within the context of an information technology (IT) distribution model, catering to various users such as customers 120, end customers 130, vendors 140, resellers 150, and other entities involved in the distribution process. This operating environment encompasses a broad range of characteristics and dynamics that contribute to the success and efficiency of the distribution platform.

Customers 120 within the operating environment of System 110 represent businesses or individuals seeking IT solutions to meet their specific needs. These customers may require a diverse range of IT products such as hardware components, software applications, networking equipment, or cloud-based services. System 110 provides customers with a user-friendly interface, allowing them to browse, search, and select the most suitable IT solutions based on their requirements. Customers can also access real-time data and analytics through System 110, empowering them to make informed decisions and optimize their IT infrastructure.

End customers 130 can be the ultimate beneficiaries of the IT solutions provided by System 110. They may include businesses or individuals who utilize IT products and services to enhance their operations, productivity, or daily activities. End customers rely on System 110 to access a wide array of IT solutions, ensuring they have access to the latest technologies and innovations in the market. System 110 enables end customers to track their orders, receive updates on delivery status, and access customer support services, thereby enhancing their overall experience.

Vendors 140 can encompass manufacturers, distributors, and suppliers who offer a diverse range of IT products and services. System 110 acts as a centralized platform for vendors to showcase their offerings, manage inventory, and facilitate transactions with customers and resellers. Vendors can leverage System 110 to streamline their supply chain operations, manage pricing and promotions, and gain insights into customer preferences and market trends. By integrating with System 110, vendors can expand their reach, access new markets, and enhance their overall visibility and competitiveness.

Resellers 150 can be intermediaries within the distribution model who bridge the gap between vendors and customers. They play a vital role in the IT distribution ecosystem by connecting customers with the right IT solutions from various vendors. Resellers may include retailers, value-added resellers (VARs), system integrators, or managed service providers. System 110 enables resellers to access a comprehensive catalog of IT solutions, manage their sales pipeline, and provide value-added services to customers. By leveraging System 110, resellers can enhance their customer relationships, optimize their product offerings, and increase their revenue streams.

Within the operating environment of System 110, there can be various dynamics and characteristics that contribute to its effectiveness. These dynamics include real-time data exchange, integration with existing enterprise systems, scal-
ability, and flexibility. System 110 ensures that relevant data
can be exchanged in real-time between users, enabling
accurate decision-making and timely actions. Integration
with existing enterprise systems such as enterprise resource
planning (ERP) systems, customer relationship management
(CRM) systems, and warehouse management systems
allows for communication and interoperability, eliminating
data silos and enabling end-to-end visibility.

System 110 can achieve scalability and flexibility. It can
accommodate the growing demands of the IT distribution
model, whether it involves an expanding customer base, an
increasing number of vendors, or a wider range of IT
products and services. System 110 can be configured to
handle large-scale data processing, storage, and analysis,
ensuring that it can support the evolving needs of the
distribution platform. Additionally, System 110 leverages a
technology stack that includes .NET, Java, and other suitable
technologies.

In summary, the operating environment of System 110
within the IT distribution model encompasses customers
120, end customers 130, vendors 140, resellers 150, and
other entities involved in the distribution process. System
110 serves as a centralized platform that facilitates efficient
collaboration, communication, and transactional processes
between these users. By leveraging real-time data exchange,
integration, scalability, and flexibility, System 110 empow-
ers users to optimize their operations, enhance customer
experiences, and drive business success within the IT dis-
tribution ecosystem.

Figure 2:
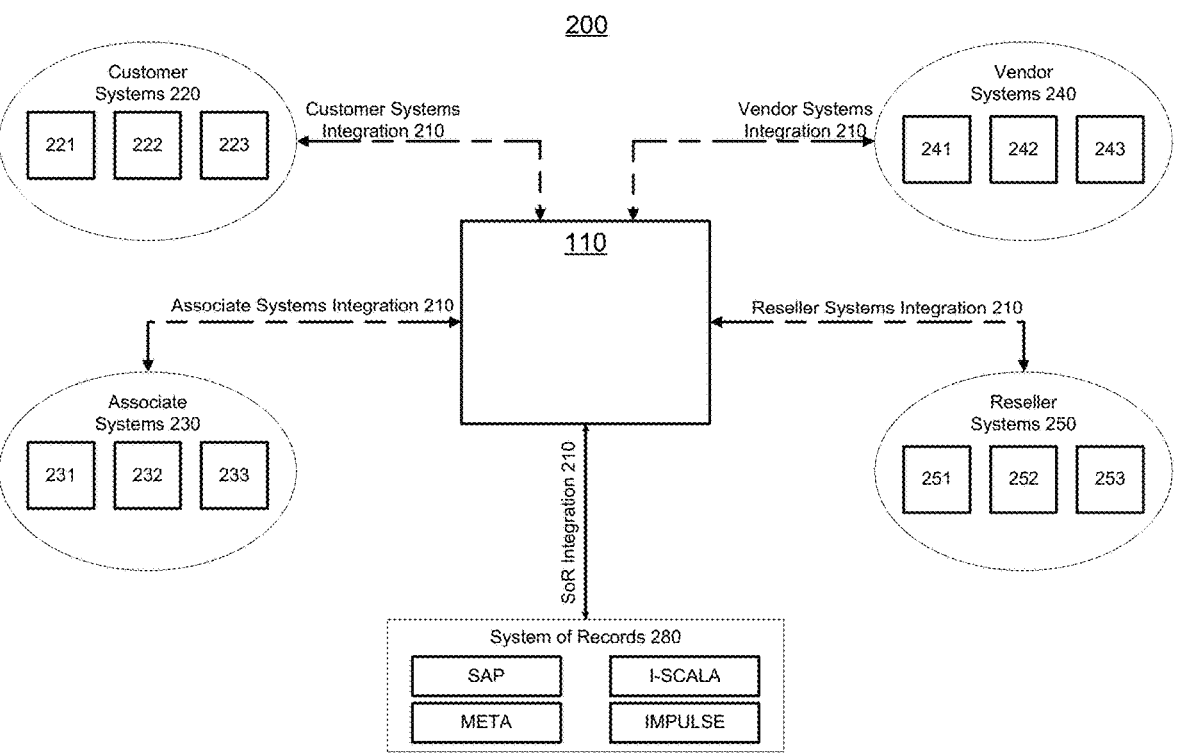
FIG. 2 illustrates one embodiment of an operating environment of the distribution platform, according to some embodiments.

FIG. 2 illustrates the operating environment 200 of the
distribution platform, which can be an embodiment of
operating environment 100 of FIG. 1. This environment can
include integration points 210, which enable data flow and
connectivity among various systems like customer systems
220, vendor systems 240, reseller systems 260, and other
entities for the implementation of a comprehensive Alerts
and Notifications system. The operating environment 200 is
designed to support real-time, event-driven notifications
using advanced data processing and AI/ML technologies.

The Alerts and Notifications system within environment
200 involves real-time monitoring and alerting of critical
events such as inventory changes, pricing updates, and
delivery tracking. Data from diverse sources, including
customer interactions and service metrics, is aggregated
from systems like CRM and analytics tools into the Real-
Time Data Mesh (RTDM). This data is then processed and
standardized by the RTDM, serving as a dynamic repository
for immediate access and dissemination of notifications.

Advanced AI algorithms in this system perform real-time
analytics and predictive notifications. Machine learning
models, including neural networks and decision trees, are
employed to process and interpret large volumes of data,
enabling timely and relevant notifications. The system lever-
ages ML algorithms for intelligent alert generation, employ-
ing techniques like ensemble learning and reinforcement
learning to refine notification processes continually.

In this operating environment, System 110 serves as the
central hub for coordinating the Alerts and Notifications
process, bridging customer systems 220, vendor systems
240, reseller systems 260, and other pertinent entities. It
integrates communication and data exchange, ensuring a
cohesive and efficient notification experience across the
distribution network. The environment utilizes a hybrid
architecture combining RESTful APIs and WebSockets,
ensuring real-time data exchange and synchronization with
SSL/TLS protocols for data security.

The integration with customer systems 220, such as CRM
and ERP platforms, is critical for the alerts system. This
allows for the real-time dissemination of notifications rel-
evant to customers' specific needs and preferences, enhanc-
ing decision-making and operational efficiency.

The data exchange among customer systems 220, vendor
systems 240, and reseller systems 260 can incorporate ETL
processes, ensuring data consistency and reliability for alert
generation. Predefined business rules and logic dictate the
flow and processing of data, with advanced mapping and
transformation tools harmonizing disparate data formats for
unified notification delivery.

Integration with associate systems 230 through integra-
tion point 210 supports the efficiency of the Alerts and
Notifications process by providing market and product data
for generating accurate and timely alerts.

The vendor system integration ensures that vendors con-
nected to System 110 can receive real-time notifications on
key metrics such as inventory levels and pricing changes,
essential for maintaining up-to-date information in a
dynamic market environment.

Reseller System Integration: Through integration point
210, reseller systems 260 connect to System 110, gaining
access to real-time notifications on product availability,
pricing updates, and customer order statuses, enabling them
to manage customer relationships and sales processes more
effectively.

Other Entity System Integration: Integration point 210
also connects other entities in the distribution process,
facilitating efficient collaboration and distribution through
the real-time exchange of alerts and notifications. This
integration is pivotal for maintaining a responsive and
informed distribution ecosystem.

System 110 employs AI and ML capabilities to automate
and optimize the Alerts and Notifications process according
to dynamic market conditions and individual user prefer-
ences. This ensures timely and relevant notifications across
the distribution network.

Integration points 210 also connect with System of
Records 280, allowing for additional data management and
integration. These systems, encompassing ERP and CRM
platforms, provide a rich data source for the Alerts and
Notifications system, enabling real-time updates and ensur-
ing accurate information dissemination.

The integration points 210 within operating environment
200 are established through standardized protocols and
APIs, ensuring compatibility and secure data transfer. Sys-
tem 110 employs protocols like RESTful APIs, SOAP, or
GraphQL for effective communication and data exchange.

To ensure secure access and data protection, System 110
incorporates authentication and authorization mechanisms,
utilizing technologies like OAuth or JSON Web Tokens
(JWT). This maintains data integrity and confidentiality
across the notification network.

The data flow within operating environment 200 enables
users to operate within a connected ecosystem of real-time
alerts and notifications. Data generated at various stages of
the distribution process is shared among customer systems
220, vendor systems 240, reseller systems 260, and other
entities, enhancing operational efficiency and decision-mak-
ing.

System 110 can leverage advanced technologies like
Typescript, NodeJS, ReactJS, .NET Core, C #, etc., to
support the integration points 210 and communication
within the operating environment 200.

System 110's architecture also facilitates the processing,
harmonization, and real-time accessibility of data across the distribution network, empowering users with immediate access to relevant, real-time information for timely decision-making.

Each of the customer systems, such as customer systems 220, is configured to receive and interact with the alerts and notifications, facilitating immediate action and response to real-time information. This includes devices like desktops, laptops, mobile phones, and smartwatches, each capable of presenting the alerts through various user interfaces.

The components of customer systems are configured using applications like web browsers running on central processing units, such as Intel Pentium processors or similar. The distribution platform (System 110) and its components are similarly configured, ensuring integrated interaction and notification management.

Machine-readable storage media contain instructions to program computers to execute the processes of the Alerts and Notifications system. The computer code for operating and configuring the platform can be stored on various memory media and transmitted over conventional network connections using standard communication protocols.

The implementation of the system can be performed in various programming languages and executed on different platforms, depending on the specific requirements of the distribution platform and the environment in which it operates.

Thus, operating environment 200 couples the distribution platform with integration points 210 and data flow, enabling efficient collaboration and streamlined distribution processes through a responsive Alerts and Notifications system. This system significantly enhances the responsiveness and operational efficiency of the entire distribution network.

In conclusion, FIG. 2 depicts a dynamic and interconnected operating environment 200 where real-time alerts and notifications are central to the distribution process, facilitating informed decisions and efficient operations across various entities in the supply chain. The integration of advanced AI/ML technologies, real-time data processing, and a comprehensive alerts mechanism positions System 110 as a pivotal component in modernizing and optimizing distribution and supply chain management.

Figure 3:
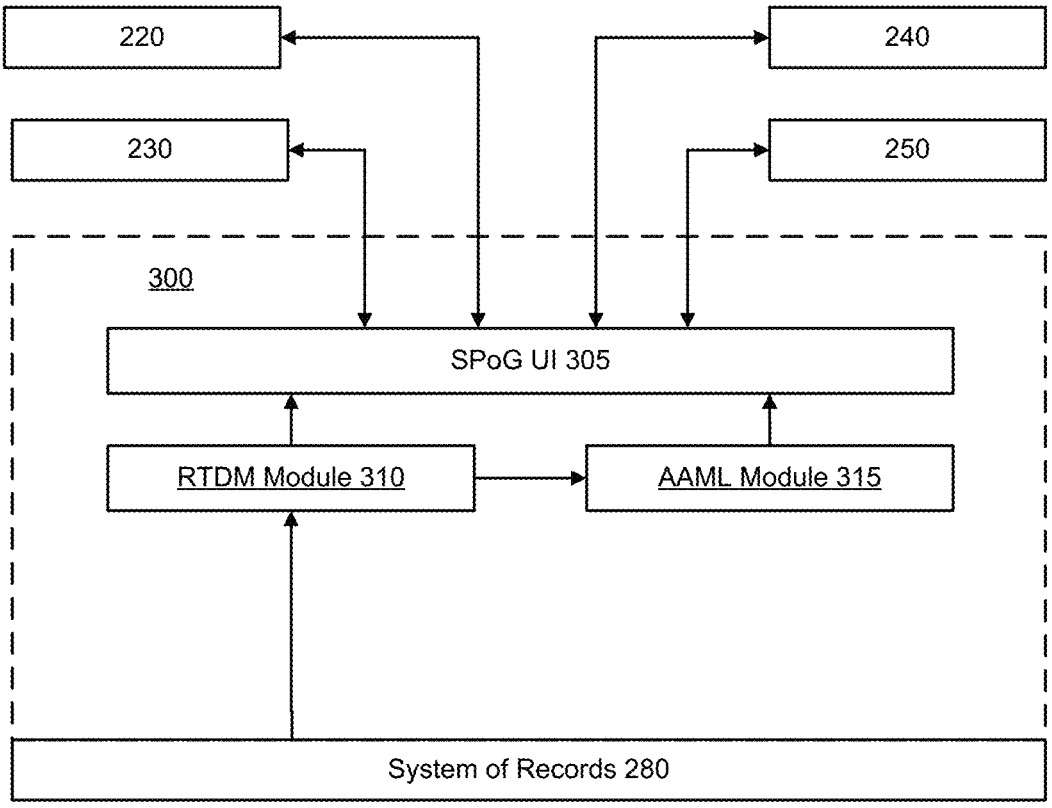
FIG. 3 illustrates an embodiment of a system for distribution management.

FIG. 3 illustrates a system 300 for supply chain and distribution management. System 300 (FIG. 3) is a supply chain and distribution management solution configured to address the challenges faced by fragmented distribution ecosystems in the global distribution industry. System 300 can include several interconnected components and modules that work in harmony to optimize supply chain and distribution operations, enhance collaboration, and drive business efficiency.

The Single Pane of Glass (SPoG) UI 305 serves as a centralized user interface, providing users with a unified view of the entire supply chain. It consolidates information from various sources and presents real-time data, analytics, and functionalities tailored to the specific roles and responsibilities of users. By offering a customizable and intuitive dashboard-style layout, the SPoG UI enables users to access relevant information and tools, empowering them to make data-driven decisions and efficiently manage their supply chain and distribution activities.

For example, a logistics manager can use the SPoG UI to monitor the status of shipments, track delivery routes, and view real-time inventory levels across multiple warehouses. They can visualize data through interactive charts and graphs, such as a map displaying the current location of each shipment or a bar chart showing inventory levels by product category. By having a unified view of the supply chain, the logistics manager can identify bottlenecks, optimize routes, and ensure timely delivery of goods.

The SPoG UI 305 integrates with other modules of System 300, facilitating real-time data exchange, synchronized operations, and streamlined workflows. Through API integrations, data synchronization mechanisms, and event-driven architectures, SPoG UI 305 ensures smooth information flow and enables collaborative decision-making across the distribution ecosystem. SPoG UI 305 is designed with a user-centric approach, featuring an intuitive and responsive layout. It utilizes front-end technologies to render dynamic and interactive data visualizations. Customizable dashboards allow users to tailor their views based on specific roles and requirements. The UI supports drag-and-drop functionality for ease of use, and its adaptive design ensures compatibility across various devices and platforms. Advanced filtering and search capabilities enable users to efficiently navigate and access relevant supply chain data and insights.

For instance, when a purchase order is generated in the SPoG UI, the system automatically updates the inventory levels, triggers a notification to the warehouse management system, and initiates the shipping process. This integration enables efficient order fulfillment, reduces manual errors, and enhances overall supply chain visibility.

The Real-Time Data Mesh (RTDM) module 310 is another component of System 300, responsible for ensuring the flow of data within the distribution ecosystem. It aggregates data from multiple sources, harmonizes it, and ensures its availability in real-time.

In a distribution network, the RTDM module collects data from various systems, including inventory management systems, point-of-sale terminals, and customer relationship management systems. It harmonizes this data by aligning formats, standardizing units of measurement, and reconciling any discrepancies. The harmonized data can be then made available in real-time, allowing users to access accurate and current information across the supply chain.

The RTDM module 310 can be configured to capture changes in data across multiple transactional systems in real-time. It employs a Change Data Capture (CDC) mechanism that constantly monitors the transactional systems, detecting any updates or modifications. The CDC component can be specifically configured to work with various transactional systems, including legacy ERP systems, Customer Relationship Management (CRM) systems, and other enterprise-wide systems, ensuring compatibility and flexibility for businesses operating in diverse environments.

By having access to real-time data, users can make timely decisions and respond quickly to changing market conditions. For example, if the RTDM module detects a sudden spike in demand for a particular product, it can trigger alerts to the production team, enabling them to adjust manufacturing schedules and prevent stockouts.

The RTDM module 310 facilitates data management within supply chain operations. It enables real-time harmonization of data from multiple sources, freeing vendors, resellers, customers, and end customers from constraints imposed by legacy ERP systems. This enhanced flexibility supports improved efficiency, customer service, and innovation.

Another component of System 300 is the Advanced Analytics and Machine Learning (AAML) module 315. Leveraging powerful analytics tools and algorithms such as Apache Spark, TensorFlow, or scikit-learn, the AAML module extracts valuable insights from the collected data. It enables advanced analytics, predictive modeling, anomaly detection, and other machine learning capabilities.

For instance, the AAML module can analyze historical sales data to identify seasonal patterns and predict future demand. It can generate forecasts that help optimize inventory levels, ensure stock availability during peak seasons, and minimize excess inventory costs. By leveraging machine learning algorithms, the AAML module automates repetitive tasks, predicts customer preferences, and optimizes supply chain processes.

In addition to demand forecasting, the AAML module can provide insights into customer behavior, enabling targeted marketing campaigns and personalized customer experiences. For example, by analyzing customer data, the module can identify cross-selling or upselling opportunities and recommend relevant products to individual customers.

Furthermore, the AAML module can analyze data from various sources, such as social media feeds, customer reviews, and market trends, to gain a deeper understanding of consumer sentiment and preferences. This information can be used to inform product development decisions, identify emerging market trends, and adapt business strategies to meet evolving consumer expectations.

System 300 emphasizes integration and interoperability to connect with existing enterprise systems such as ERP systems, warehouse management systems, and customer relationship management systems. By establishing connections and data flows between these systems, System 300 enables smooth data exchange, process automation, and end-to-end visibility across the supply chain. Integration protocols, APIs, and data connectors facilitate communication and interoperability among different modules and components, creating a holistic and connected distribution ecosystem.

The implementation and deployment of System 300 can be tailored to meet specific business needs. It can be deployed as a cloud-native solution using containerization technologies like Docker and orchestration frameworks like Kubernetes. This approach ensures scalability, easy management, and efficient updates across different environments. The implementation process involves configuring the system to align with specific supply chain requirements, integrating with existing systems, and customizing the modules and components based on the business's needs and preferences.

System 300 for supply chain and distribution management is a comprehensive and innovative solution that addresses the challenges faced by fragmented distribution ecosystems. It combines the power of the SPoG UI 305, the RTDM module 310, and the AAML module 315, along with integration with existing systems. System 300 can be configured to provide end-to-end visibility, data-driven decision-making, and optimized supply chain operations. The examples and options provided in this description are non-limiting and can be customized to meet specific industry requirements, driving efficiency and success in supply chain and distribution management.

Figure 4:
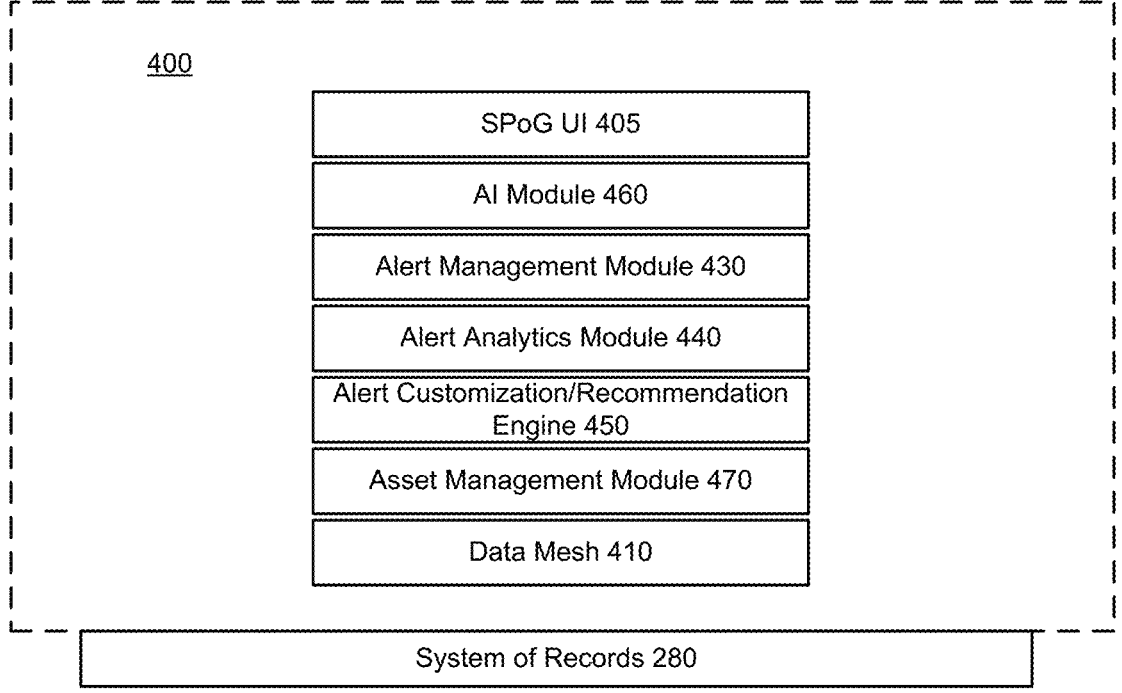
FIG. 4 depicts a system for automated alerts and notification management, according to an embodiment.

FIG. 4 depicts an embodiment of System 400, primarily focused on the Alerts and Notifications system within a technology distribution platform. This system integrates the Single Pane of Glass User Interface (SPoG UI 405), Real-Time Data Mesh (RTDM 410), and advanced AI/ML technologies (AI Module 460). System 400 is configured for integration with existing reseller systems, ensuring efficient data exchange, synchronization, and real-time alerting functionalities.

The SPoG UI 405, serving as the primary user interface, is pivotal for the Alerts and Notifications system. It provides users with an interactive platform to receive and manage alerts related to various distribution activities. This interface displays real-time data from the Data Mesh 410 and allows users to configure notification preferences, access alert histories, and interact with real-time alerts. SPoG UI 405, developed using responsive web technologies, is accessible across multiple device types, ensuring users stay informed regardless of their device.

Data Mesh 410 forms the core of the Alerts and Notifications system. It aggregates and harmonizes data from diverse sources, including ERPs, vendor platforms, and third-party databases, ensuring that operational modules within System 400 access consistent and current information. This harmonization is critical for generating accurate, timely alerts and notifications, particularly in dynamic distribution environments.

The AI Module 460 in System 400 is tailored to enhance the Alerts and Notifications system. It uses machine learning algorithms and predictive modeling to identify patterns and trends that trigger alerts. This module dynamically processes data from Data Mesh 410 to generate real-time notifications about critical events like inventory changes, pricing updates, and shipment statuses, enhancing decision-making and response times for users.

In some embodiments, AI Module 460 incorporates deep learning neural networks for pattern recognition, essential for predictive alerts in the distribution process. The module also uses decision trees and clustering algorithms to categorize and segment alert types, ensuring users receive relevant and customized notifications.

Real-time processing capabilities of AI Module 460, based on data from Data Mesh 410, enable the system to adapt notifications to current market conditions and user behaviors. This includes employing advanced analytics for proactive alert generation, ensuring users are informed promptly of critical changes or updates in the distribution network.

AI Module 460's reinforcement learning algorithms continually refine the notification process, ensuring that alerts remain relevant and actionable over time. The module also uses natural language processing (NLP) techniques to interpret user feedback, further enhancing the alert customization process.

Data Mesh 410 provides real-time tracking of data for the Alerts and Notifications system, driving predictive and responsive alerts. Data Mesh 410 can be implemented in System 400 to enable tracking usage patterns and market feedback, facilitating a responsive alert system in a dynamic distribution environment.

Predictive analytics tools within AI Module 460 use time series forecasting and optimization algorithms to anticipate future trends and demand in the distribution network, informing users through predictive alerts. This proactive approach to notifications enables users to prepare and respond effectively to changing market conditions.

The Alert Management Module 430 in System 400 oversees the lifecycle of alerts and notifications, managing their initiation, modification, and dissemination. It ensures that alerts are delivered in compliance with user preferences and contractual agreements, maintaining a high level of relevance and accuracy.

Alert Analytics Module 440 in System 400 is configured to support the Alerts and Notifications system by providing financial and usage insights based on alert data. This module helps in understanding the impact of alerts on user behavior and subscription changes, offering strategic insights for business decision-making.

The Alert Customization and Recommendation Engine 450, integrated with SPoG UI 405 and AI Module 460 enables personalizing the Alerts and Notifications system. It recommends alert configurations and preferences based on user input and historical data analysis, enhancing the user experience by delivering tailored alert content.

Asset Tracking Module 470 in System 400 supports the Alerts and Notifications system by tracking and managing the allocation of assets relevant to the alerts. This includes monitoring inventory levels and ensuring that alerts related to asset availability are accurate and timely.

Thereby, System 400 transforms the traditional distribution model by leveraging a responsive Alerts and Notifications system. This system, powered by real-time data processing, AI-driven analytics, and user customization capabilities, ensures that users are proactively informed and can make timely decisions based on real-time alerts and notifications in the technology distribution environment.

Figure 5:
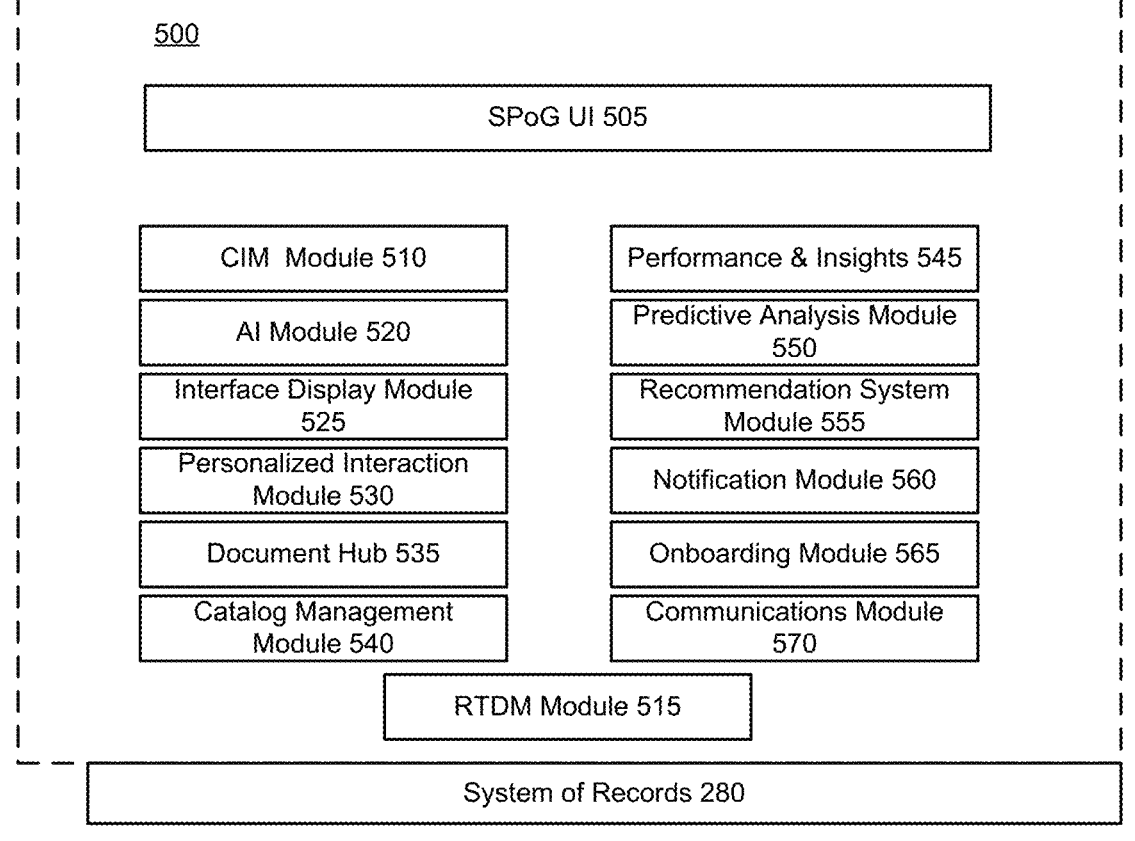
FIG. 5 illustrates an RTDM module, according to an embodiment.

FIG. 5 depicts an embodiment of an advanced distribution platform including System 500 for managing a complex distribution network, which can be an embodiment of System 300, and provides a technology distribution platform for optimizing the management and operation of distribution networks. System 500 includes several interconnected modules, each serving specific functions and contributing to the overall efficiency of supply chain operations. In some embodiments, these modules can include SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570.

System 500, as an embodiment of System 300, can use a range of technologies and algorithms to enable supply chain and distribution management. These technologies and algorithms facilitate efficient data processing, personalized interactions, real-time analytics, secure communication, and effective management of documents, catalogs, and performance metrics.

The SPoG UI 505, in some embodiments, serves as the central interface within System 500, providing users with a unified view of the entire distribution network. It utilizes frontend technologies such as ReactJS, TypeScript, and Node.js to create interactive and responsive user interfaces. These technologies enable the SPoG UI 505 to deliver a user-friendly experience, allowing users to access relevant information, navigate through different modules, and perform tasks efficiently.

The CIM 510, or Customer Interaction Module, employs algorithms and technologies such as Oracle Eloqua, Adobe Target, and Okta to manage customer relationships within the distribution network. These technologies enable the module to handle customer data securely, personalize customer experiences, and provide access control for users.

The RTDM module 515, or Real-Time Data Mesh module, is a component of System 500 that ensures the smooth flow of data across the distribution ecosystem. It utilizes technologies such as Apache Kafka, Apache Flink, or Apache Pulsar for data ingestion, processing, and stream management. These technologies enable the RTDM module 515 to handle real-time data streams, process large volumes of data, and ensure low-latency data processing. Additionally, the module employs Change Data Capture (CDC) mechanisms to capture real-time data updates from various transactional systems, such as legacy ERP systems and CRM systems. This capability allows users to access current and accurate information for informed decision-making.

The AI module 520 within System 500 can use advanced analytics and machine learning algorithms, including Apache Spark, TensorFlow, and scikit-learn, to extract valuable insights from data. These algorithms enable the module to automate repetitive tasks, predict demand patterns, optimize inventory levels, and improve overall supply chain efficiency. For example, the AI module 520 can utilize predictive models to forecast demand, allowing users to optimize inventory management and minimize stockouts or overstock situations.

The Interface Display Module 525 focuses on presenting data and information in a clear and user-friendly manner. It utilizes technologies such as HTML, CSS, and JavaScript frameworks like ReactJS to create interactive and responsive user interfaces. These technologies allow users to visualize data using various data visualization techniques, such as graphs, charts, and tables, enabling efficient data comprehension, comparison, and trend analysis.

The Personalized Interaction Module 530 utilizes customer data, historical trends, and machine learning algorithms to generate personalized recommendations for products or services. It employs technologies like Adobe Target, Apache Spark, and TensorFlow for data analysis, modeling, and delivering targeted recommendations. For example, the module can analyze customer preferences and purchase history to provide personalized product recommendations, enhancing customer satisfaction and driving sales.

The Document Hub 535 serves as a centralized repository for storing and managing documents within System 500. It utilizes technologies like SeeBurger and Elastic Cloud for efficient document management, storage, and retrieval. For instance, the Document Hub 535 can employ SeeBurger's document management capabilities to categorize and organize documents based on their types, such as contracts, invoices, product specifications, or compliance documents, allowing users to easily access and retrieve relevant documents when needed.

The Catalog Management Module 540 enables the creation, management, and distribution of current product catalogs. It ensures that users have access to the latest product information, including specifications, pricing, availability, and promotions. Technologies like Kentico and Akamai can be employed to facilitate catalog updates, content delivery, and caching. For example, the module can use Akamai's content delivery network (CDN) to deliver catalog information to users quickly and efficiently, regardless of their geographical location.

The Performance and Insight Markers Display 545 collects, analyzes, and visualizes real-time performance metrics and insights related to supply chain operations. It utilizes tools like Splunk and Datadog to enable effective performance monitoring and provide actionable insights. For instance, the module can utilize Splunk's log analysis capabilities to identify performance bottlenecks in the supply chain, enabling users to take proactive measures to optimize operations.

The Predictive Analytics Module 550 employs machine learning algorithms and predictive models to forecast demand patterns, optimize inventory levels, and enhance overall supply chain efficiency. It utilizes technologies such as Apache Spark and TensorFlow for data analysis, modeling, and prediction. For example, the module can utilize TensorFlow's deep learning capabilities to analyze historical sales data and predict future demand, allowing users to optimize inventory levels and minimize costs.

The Recommendation System Module 555 focuses on providing intelligent recommendations to users within the distribution network. It generates personalized recommendations for products or services based on customer data, historical trends, and machine learning algorithms. Technologies like Adobe Target and Apache Spark can be employed for data analysis, modeling, and delivering targeted recommendations. For instance, the module can use Adobe Target's recommendation engine to analyze customer preferences and behavior, and deliver personalized product recommendations across various channels, enhancing customer engagement and driving sales.

The Notification Module 560 enables the distribution of real-time notifications to users regarding important events, updates, or alerts within the supply chain. It utilizes technologies like Apigee X and TIBCO for message queues, event-driven architectures, and notification delivery. For example, the module can utilize TIBCO's messaging infrastructure to send real-time notifications to users' devices, ensuring timely and relevant information dissemination.

The Self-Onboarding Module 565 facilitates the onboarding process for new users entering the distribution network. It provides guided steps, tutorials, or documentation to help users become familiar with the system and its functionalities. Technologies such as Okta and Kentico can be employed to ensure secure user authentication, access control, and self-learning resources. For instance, the module can utilize Okta's identity and access management capabilities to securely onboard new users, providing them with appropriate access permissions and guiding them through the system's functionalities.

The Communication Module 570 enables communication and collaboration within System 500. It provides channels for users to interact, exchange messages, share documents, and collaborate on projects. Technologies like Apigee Edge and Adobe Launch can be employed to facilitate secure and efficient communication, document sharing, and version control. For example, the module can utilize Apigee Edge's API management capabilities to ensure secure and reliable communication between users, enabling them to collaborate effectively.

Thereby, System 500 can incorporate various modules that utilize a diverse range of technologies and algorithms to optimize supply chain and distribution management. These modules, including SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570, work together to provide end-to-end visibility, data-driven decision-making, personalized interactions, real-time analytics, and streamlined communication within the distribution network. The incorporation of specific technologies and algorithms enables efficient data management, secure communication, personalized experiences, and effective performance monitoring, contributing to enhanced operational efficiency and success in supply chain and distribution management.

Real Time Data Mesh

Figure 6:
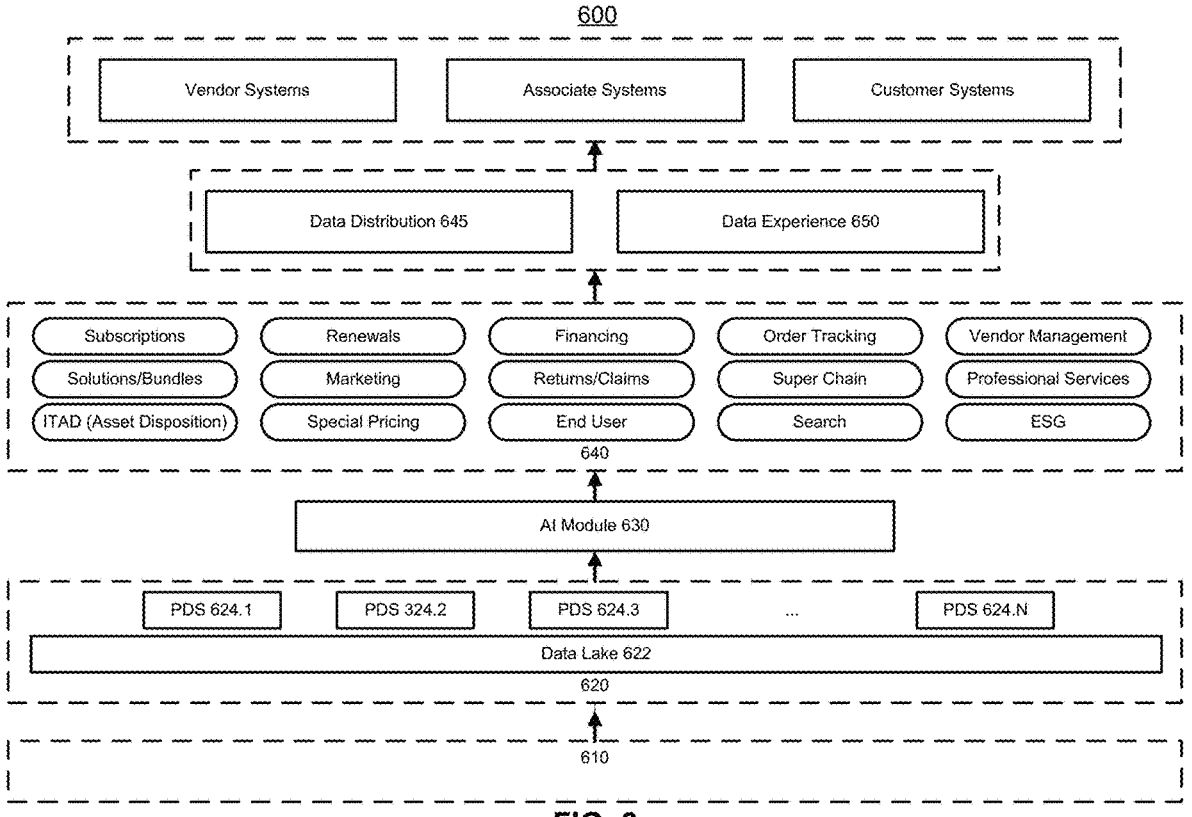
FIG. 6 illustrates a SPoG UI, according to an embodiment.

FIG. 6 illustrates RTDM module 600, according to an embodiment. RTDM module 600, which can be an embodiment of RTDM module 310, can include interconnected components, processes, and sub-systems configured to enable real-time data management and analysis.

The RTDM module 600, as depicted in FIG. 5, represents an effective data mesh and change capture component within the overall system architecture. The module can be configured to provide real-time data management and standardization capabilities, enabling efficient operations within the supply chain and distribution management domain.

RTDM module 600 can include an integration layer 610 (also referred to as a "system of records") that integrates with various enterprise systems. These enterprise systems can include ERPs such as SAP, Impulse, META, and I-SCALA, among others, and other data sources. Integration layer 610 can process data exchange and synchronization between RTDM module 600 and these systems. Data feeds can be established to retrieve relevant information from the system of records, such as sales orders, purchase orders, inventory data, and customer information. These feeds enable real-time data updates and ensure that the RTDM module operates with the most current and accurate data.

RTDM module 600 can include data layer 620 configured to process and translate data for retrieval and analysis. Data layer 620 includes data mesh, a cloud-based infrastructure configured to provide scalable and fault-tolerant data storage capabilities. Within the data mesh, multiple Purposive Datastores (PDS) can be deployed to store specific types of data, such as customer data, product data, or inventory data. Each PDS can be optimized for efficient data retrieval based on specific use cases and requirements. The PDSes can be configured to store specific types of data, such as customer data, product data, finance data, and more. These PDS serve as repositories for canonized and/or standardized data, ensuring data consistency and integrity across the system.

In some embodiments, RTDM module 600 implements a data replication mechanism to capture real-time changes from multiple data sources, including transactional systems like ERPs (e.g., SAP, Impulse, META, I-SCALA). The captured data can then be processed and standardized on-the-fly, transforming it into a standardized format suitable for analysis and integration. This process ensures that the data is readily available and current within the data mesh, facilitating real-time insights and decision-making.

More specifically, data layer 620 within the RTDM module 600 can be configured as a powerful and flexible foundation for managing and processing data within the distribution ecosystem. In some embodiments, data layer 620 can encompasses a highly scalable and robust data lake, which can be referred to as data lake 622, along with a set of purposive datastores (PDSes), which can be denoted as PDSes 624.1 to 624.N. These components integrate to ensure efficient data management, standardization, and real-time availability.

Data layer 620 incudes data lake 622, a state-of-the-art storage and processing infrastructure configured to handle the ever-increasing volume, variety, and velocity of data generated within the supply chain. Built upon a scalable distributed file system, such as Apache Hadoop Distributed File System (HDFS) or Amazon S3, the data lake provides a unified and scalable platform for storing both structured and unstructured data. Leveraging the elasticity and fault-tolerance of cloud-based storage, data lake 622 can accommodate the influx of data from diverse sources.

Associated with data lake 622, a population of purposive datastores, PDSes 624.1 to 624.N, can be employed. Each PDS 624 can function as a purpose-built repository optimized for storing and retrieving specific types of data relevant to the supply chain domain. In some non-limiting examples, PDS 624.1 may be dedicated to customer data, storing information such as customer profiles, preferences, and transaction history. PDS 624.2 may be focused on product data, encompassing details about SKU codes, descriptions, pricing, and inventory levels. These purposive datastores allow for efficient data retrieval, analysis, and processing, catering to the diverse needs of supply chain users.

To ensure real-time data synchronization, data layer 620 can be configured to employ one or more change data capture (CDC) mechanisms. These CDC mechanisms can be integrated with the transactional systems, such as legacy ERPs like SAP, Impulse, META, and I-SCALA, as well as other enterprise-wide systems. CDC constantly monitors these systems for any updates, modifications, or new transactions and captures them in real-time. By capturing these changes, data layer 620 ensures that the data within the data lake 622 and PDSes 624 remains current, providing users with real-time insights into the distribution ecosystem.

In some embodiments, data layer 620 can be implemented to facilitate integration with existing enterprise systems using one or more frameworks, such as .NET or Java, ensuring compatibility with a wide range of existing systems and providing flexibility for customization and extensibility. For example, data layer 620 can utilize the Java technology stack, including frameworks like Spring and Hibernate, to facilitate integration with a system of records having a population of diverse ERP systems and other enterprise-wide solutions. This can facilitate smooth data exchange, process automation, and end-to-end visibility across the supply chain.

In terms of data processing and analytics, data layer 620 can use the capabilities of distributed computing frameworks, such as Apache Spark or Apache Flink in some non-limiting examples. These frameworks can enable parallel processing and distributed computing across large-scale datasets stored in the data lake and PDSes. By leveraging these frameworks, supply chain users can perform complex analytical tasks, apply machine learning algorithms, and derive valuable insights from the data. For instance, data layer 620 can use Apache Spark's machine learning libraries to develop predictive models for demand forecasting, optimize inventory levels, and identify potential supply chain risks.

In some embodiments, data layer 620 can incorporate data governance and security measures. Fine-grained access control mechanisms and authentication protocols ensure that only authorized users can access and modify the data within the data lake and PDSes. Data encryption techniques, both at rest and in transit, safeguard the sensitive supply chain information against unauthorized access. Additionally, data layer 620 can implement data lineage and audit trail mechanisms, allowing users to trace the origin and history of data, ensuring data integrity and compliance with regulatory requirements.

In some embodiments, data layer 620 can be deployed in a cloud-native environment, leveraging containerization technologies such as Docker and orchestration frameworks like Kubernetes. This approach ensures scalability, resilience, and efficient resource allocation. For example, data layer 620 can be deployed on cloud infrastructure provided by AWS, Azure, or Google Cloud, utilizing their managed services and scalable storage options. This allows for scaling of resources based on demand, minimizing operational overhead and providing an elastic infrastructure for managing supply chain data.

Data layer 620 of RTDM module 600 can incorporate a highly scalable data lake, data lake 622, along with purpose-built PDSes, PDSes 624.1 to 624.N, and employing CDC mechanisms, data layer 620 ensures efficient data management, standardization, and real-time availability. In a non-limiting example, Data Layer 620 can be implemented utilizing any appropriate technology, such as .NET or Java, and/or distributed computing frameworks like Apache Spark, enables powerful data processing, advanced analytics, and machine learning capabilities. With data governance and security measures, data layer 620 ensures data integrity, confidentiality, and compliance. Through its scalable infrastructure and integration with existing systems, data layer 620 enables supply chain users to make data-driven decisions, optimize operations, and drive business success in the dynamic and complex distribution environment.

RTDM module 600 can include an AI module 630 configured to implement one or more algorithms and machine learning models to analyze the stored data in data layer 620 and derive meaningful insights. In some non-limiting examples, AI module 630 can apply predictive analytics, anomaly detection, and optimization algorithms to identify patterns, trends, and potential risks within the supply chain. AI module 630 can continuously learns from new data inputs and adapts its models to provide accurate and current insights. AI module 630 can generate predictions, recommendations, and alerts and publish such insights to dedicated data feeds.

Data engine layer 640 comprises a set of interconnected systems responsible for data ingestion, processing, transformation, and integration. Data engine layer 640 of RTDM module 600 can include a collection of headless engines 640.1 to 640.N that operate autonomously. These engines represent distinct functionalities within the system and can include, for example, one or more recommendation engines, insights engines, and subscription management engines. Engines 640.1 to 640.N can use the standardized data stored in the data mesh to deliver specific business logic and services. Each engine can be configured to be pluggable, allowing for flexibility and future expansion of the module's capabilities. Exemplary engines are shorn in FIG. 5, which are not intended to be limiting. Any additional headless engine can be included in data engine layer 640 or in other exemplary layers of the disclosed system.

These systems can be configured to receive data from multiple sources, such as transactional systems, IoT devices, and external data providers. The data ingestion process involves extracting data from these sources and transforming it into a standardized format. Data processing algorithms can be applied to cleanse, aggregate, and enrich the data, making it ready for further analysis and integration.

Further, to facilitate integration and access to RTDM module 600, a data distribution mechanism can be employed. Data distribution mechanism 645 can be configured to include one or more APIs to facilitate distribution of data from the data mesh and engines to various endpoints, including user interfaces, micro front ends, and external systems.

Experience layer 650 focuses on delivering an intuitive and user-friendly interface for interacting with supply chain data. Experience layer 650 can include data visualization tools, interactive dashboards, and user-centric functionalities. Through this layer, users can retrieve and analyze real-time data related to various supply chain metrics such as inventory levels, sales performance, and customer demand. The user experience layer supports personalized data feeds, allowing users to customize their views and receive relevant updates based on their roles and responsibilities. Users can subscribe to specific data updates, such as inventory changes, pricing updates, or new SKU notifications, tailored to their preferences and roles.

Thereby, in some embodiments, RTDM module 600 for supply chain and distribution management can include an integration with a system of records and include one or more of a data layer with a data mesh and purposive datastores, an AI component, a data engine layer, and a user experience layer. These components work together to provide users with intuitive access to real-time supply chain data, efficient data processing and analysis, and integration with existing enterprise systems. The technical feeds and retrievals within the module ensure that users can retrieve relevant, current information and insights to make informed decisions and optimize supply chain operations. Accordingly, RTDM module 600 facilitates supply chain and distribution management by providing a scalable, real-time data management solution. Its innovative architecture allows for the rich integration of disparate data sources, efficient data standardization, and advanced analytics capabilities. The module's ability to replicate and standardize data from diverse ERPs, while maintaining auditable and repeatable transactions, provides a distinct advantage in enabling a unified view for vendors, resellers, customers, end customers, and other entities in a distribution system, including an IT distribution system.

Automated Notification Engine

Figure 7:
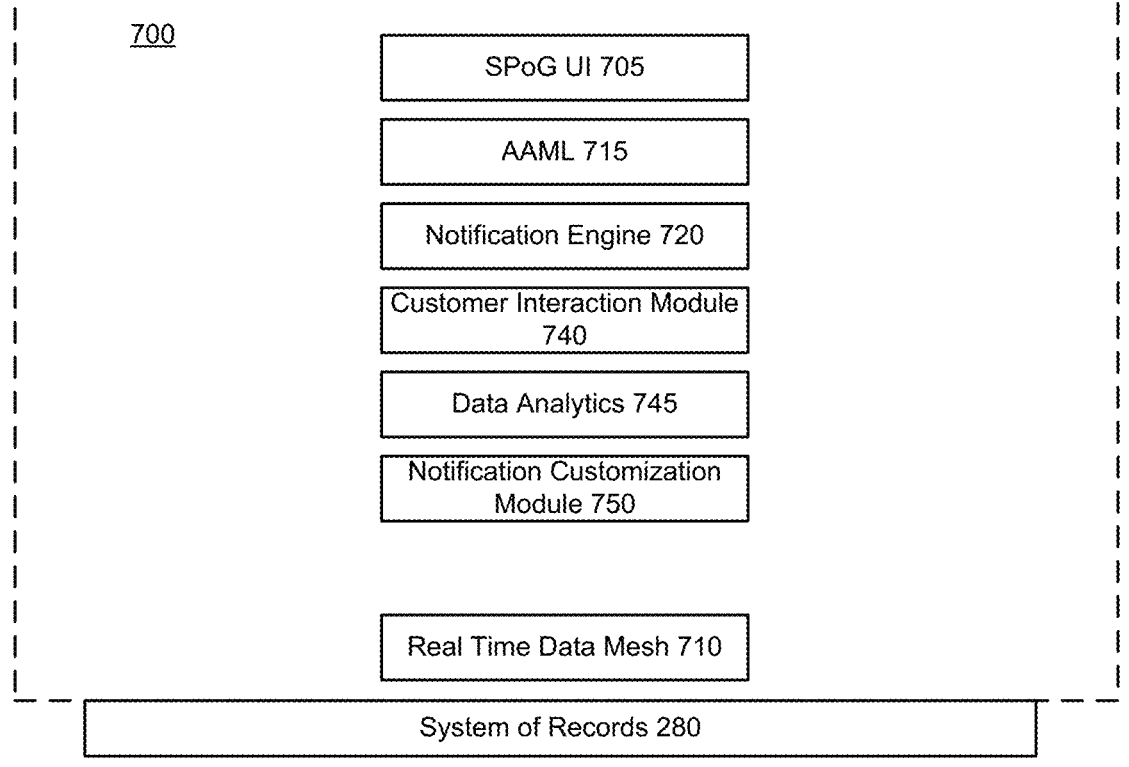
FIG. 7 illustrates a system for automated alerts and notification management, according to an embodiment.

In an embodiment, FIG. 7 illustrates System 700 as an Alerts and Notifications system within a technology distribution platform, comprising Single Pane of Glass User Interface (SPoG UI) 705, Real-Time Data Mesh (RTDM) 710, Advanced Analytics and Machine-Learning (AAML) Module 715, and an integrated Notification Engine 720.

SPoG UI 705 functions as the central command for alert interactions within System 700. It is architected with a user-focused design, offering customizable dashboards for managing alerts and notifications. The interface integrates real-time data visualization tools, enabling users to monitor alert statuses through graphical representations. It can include an intuitive layout that facilitates the workflow of setting notification parameters and provides a comprehensive view of both active and historical alerts. The UI is optimized for responsiveness across various devices and platforms, ensuring accessibility and user engagement.

Within SPoG UI 705, Consumer Interaction Module 706 facilitates direct user engagement with the notification system. This module is optimized for interaction efficiency, featuring a rule-based automation for user responses to notifications. It includes a history tracking sub-module that logs user actions and preferences to refine future alerts. Notification Customization Module 707 enables users to configure notification parameters, supporting custom alert thresholds and delivery modes, ensuring a personalized user experience. The system's data processing capabilities extend via RTDM 710, for example, to integrate with Impulse data, enabling resellers to receive notifications pertinent to their operations. This integration ensures that resellers are kept abreast of relevant information, such as inventory changes or pricing updates, in real time, fostering a responsive and informed reseller network.

RTDM 710 is configured as a comprehensive data management system, for performing alert and notification processes within System 700. It is comprised of an integration layer, a data processing layer, and sub-systems that facilitate real-time data analysis and management. System 700 establishes via RTDM 710 a link with Cloud Marketplaces through an event handling adapter (for example, for Knowledge Article Generator (KAG) integration). This adapter can function as a conduit for event-driven data, capturing marketplace activities and facilitating their transformation into structured events suitable for Notification Engine 720. This connection enables the system to harness cloud-based events, translating marketplace dynamics into actionable notifications.

The integration layer of RTDM 710 interconnects with various enterprise systems, processing data exchange and synchronization to ensure that notifications are generated from the most current and accurate data. It includes data feeds from enterprise systems that provide real-time updates on operational metrics, user activities, and system events. System 700 incorporates data paths originating from the Cloud Management Platform (CMP), where both active data streams, such as user-generated emails, and passive data, like user engagement metrics, are channeled towards the Notification Engine. These data paths are enriched through an intermediary data enrichment node, ensuring that the notification content is both context-rich and tailored to the users' profiles and preferences.

RTDM 710 includes a data layer configured to translate and process data for retrieval and analytics. It encompasses a scalable data mesh and multiple Purposive Datastores (PDS), each optimized for specific data types such as user alerts, system events, or operational metrics. These PDSes store canonized data, ensuring consistency and integrity across the system.

The data layer also can include a data replication mechanism, capturing real-time changes from transactional systems and transforming them into a standardized format for immediate analysis and action. This functionality guarantees that the notification system operates with up-to-date data, enabling real-time insights and decision-making.

RTDM 710's data layer is a formidable foundation for managing the vast data within the distribution ecosystem. It includes a scalable data lake, equipped to handle the large volume and variety of data generated. This data lake acts as a centralized platform for structured and unstructured data, supporting complex analytical tasks and machine learning algorithms to optimize notification relevance and timing. Notification Engine 720 leverages the DataLake, serving as a repository and analytics foundation, to map and merge user data with the notification logic. This integration is configured to enrich notifications with user-specific information and historical data, thus enhancing the personalization and relevance of alerts.

Furthermore, the module incorporates change data capture mechanisms, maintaining real-time data synchronization with various systems. It uses frameworks compatible with a wide array of enterprise systems, ensuring integration and facilitating smooth data exchange.

RTDM 710 also prioritizes data governance and security, implementing fine-grained access control and encryption to protect sensitive information. Containerization technologies within a cloud-native environment ensure that the module is scalable and resilient, capable of adapting to the dynamic needs of the technology distribution platform. RTDM 710 is a dynamic component within System 700, central to the efficient operation of the Notification Engine. It ensures real-time data availability, facilitating the generation of precise and actionable alerts and notifications. This module's advanced data management capabilities are essential for maintaining the integrity and responsiveness of the alerting and notification system within the technology distribution framework.

AAML Module 715 integrates a suite of advanced machine learning algorithms and data processing tools to serve as the analytical core of System 700. It analyzes incoming data streams to detect anomalies, trends, and patterns that trigger notifications. The module is configured with neural networks and decision tree algorithms that adapt and learn from data patterns over time, enhancing predictive accuracy. AAML Module 715 also incorporates natural language processing (NLP) capabilities to analyze unstructured data for sentiment and content that may impact notification relevance. The module's design includes a feedback loop mechanism, where the output of the notification system is used to recalibrate the analytical models continuously, thereby improving the context and timing of alerts.

Notification Engine 720 operates as the central processing unit within System 700 for evaluating events and crafting notifications. It is built with a rules engine that applies a set of criteria to incoming data to ascertain notification triggers. These criteria are based on both static rules and dynamic algorithms that assess event severity, categorization, and user preferences. Notification Engine 720 is also designed with template processing capabilities, enabling the creation of notification content that is consistent and tailored to the context of the alert. It can include an orchestration layer that manages the workflow of notification generation, from event detection through to dispatch, ensuring that each notification is processed accurately and disseminated in real-time. Events are emitted by source systems and processed through an Event Adapter 730, which structures raw event data into a format compatible with the Notification Engine 720. Following processing, notifications are disseminated through various channels managed by a Distribution Module 735, ensuring timely delivery to the intended recipients. Notification Engine 720 is further equipped with diversified channels, specifically designed to dispatch alerts through email and push notifications. These channels are calibrated for high throughput and can adjust the notification delivery mechanisms based on user preference and channel efficacy, thereby optimizing the reach and impact of every alert issued.

The operational flow of System 700 commences with the emission of events by the source systems. Event Adapter 730 is structured to parse and format raw event data, utilizing JSON schemas and XML for interoperability across system boundaries. The adapter is capable of handling high-volume event streams and transforming them into a standardized format for subsequent processing. Following the transformation, the Distribution Module 735 manages the multichannel dissemination of notifications. This module is designed for scalability and supports various communication protocols such as MQTT and AMQP for event broadcasting. It ensures that notifications are distributed according to user preferences and channel availability, leveraging push technology for instantaneous delivery. Interactions with consumer systems are orchestrated through a subscription model, where entities such as the XAC web message center can subscribe to specific event patterns. This model enables the system to disseminate targeted alerts and allows users to access a historical log of notifications, ensuring continuity and reference for ongoing and past events.

Within SPoG UI 705, a Consumer Interaction Module 740 allows end-users to view and manage notifications, offering a user-centric platform. This aligns with consumer systems, facilitating interaction with the generated alerts. The user experience is further refined by the interactive capabilities of the platform's web interface, which displays notifications and maintains a history of the alerts presented on-screen. Users can interact with this history, providing a feedback loop that informs future notification refinement and user mapping strategies.

The Data Analytics and Storage Component 745, part of RTDM 710, enables storage of vast amounts of event and notification data, supporting analytics, and providing a historical reference to enhance notification accuracy. Data Analytics and Storage Component 745 is configured for maintaining the integrity and accessibility of data.

A Notification Customization Module 750 within SPoG UI 705 provides users the ability to personalize their notifications, facilitating an interactive and tailored alerting experience.

The architecture of System 700 ensures an efficient and dynamic process for managing alerts and notifications, integrating data from multiple sources into a unified interface via SPoG UI 705, automating alert processing via AAML Module 715, and maintaining a real-time, standardized data repository via RTDM 710. This system enhances the overall responsiveness and operational efficiency of the technology distribution platform, ensuring users are current with the most relevant information for overall responsiveness and operational efficiency.

Figure 8:
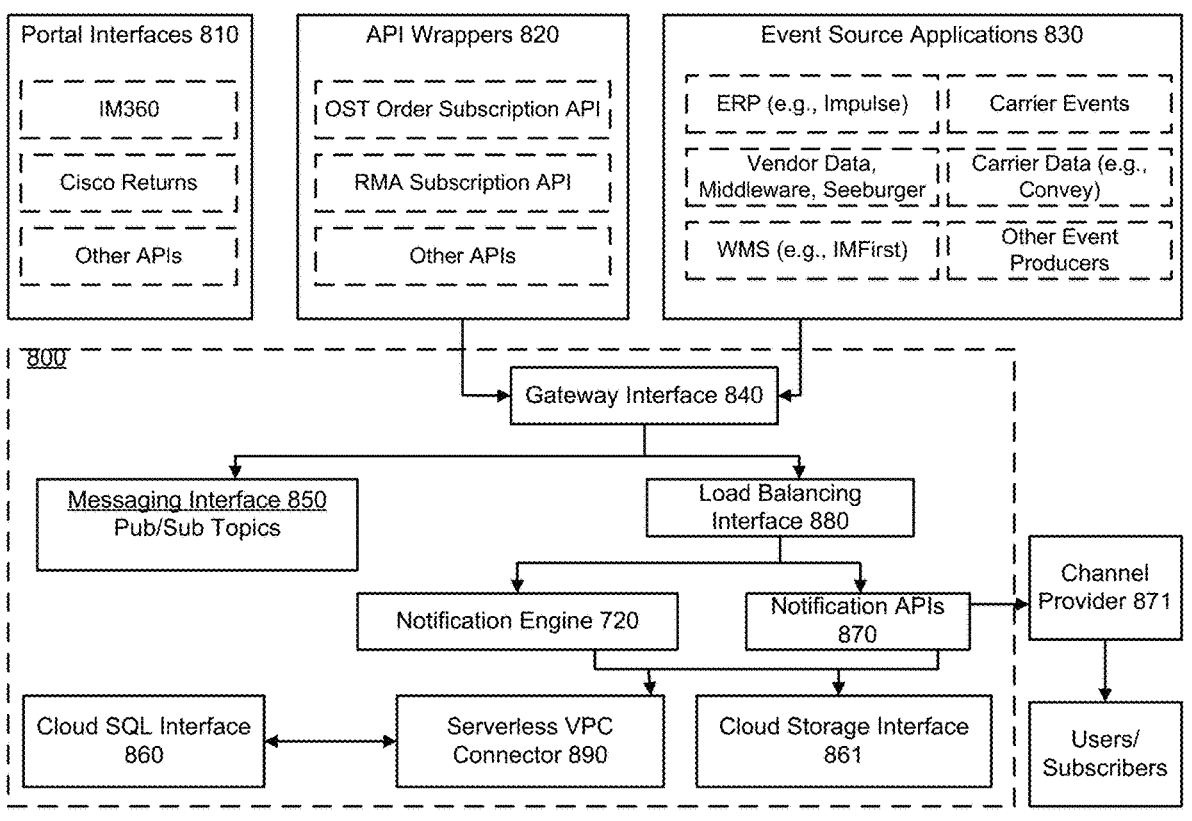
FIG. 8 is a flow diagram of a method for automated alerts and notification management, according to some embodiments of the present disclosure.

In an embodiment, FIG. 8 illustrates a Notification Architecture 800 for a technology distribution platform, which is constructed to process and manage a multitude of event data from diverse interfaces and to disseminate information effectively to end-users. Notification architecture 800 can incorporate an embodiment of Notification Engine 720 within System 700. As shown in FIG. 8, Notification Architecture 800 depicts a cloud-integrated Alerts and Notifications architecture. In some embodiments, Notification Architecture 800 integrates RTDM 710 from System 700, which provides a data management layer capable of handling high-velocity data streams and enabling real-time analytics for notification processing.

Notification Architecture 800 is configured to evaluate and format event data into notifications, comprising Gateway Interface 840, API Wrappers 820, Event Source Applications 830, Messaging Interface 850, Cloud SQL Interface 860, Cloud Storage Interface 861, Notification APIs 870, Serverless VPC Connector 890, and Channel Provider 871. RTDM 710 within Notification Architecture 800 may also include advanced data processing sub-systems that facilitate the operationalization of analytics, allowing for the transformation of raw data into actionable insights for notification customization.

Gateway Interface 840 is denoted as an API Gateway, which serves as the controlled access point for incoming data. It ensures secure data transfer by enforcing requisite protocols and directing the flow of data to the correct subsystems within the Notification Engine.

Portal Interfaces 810 are entry points for user interactions, with Portal Interface 810 dedicated to general user interactions, Portal Interface 811 designed for logistics and returns management, and Portal Interface 812 allocated for client services management. These interfaces facilitate user engagement with the system, providing customized dashboard experiences for monitoring and managing notifications.

API Wrappers 820 function as Domain-Specific Wrapper APIs, offering modular and domain-tailored conduits for event subscription and translation, converting business events into standardized notification requests for processing by the Notification Engine.

Event Source Applications 830, referred to as Source Application Interface 830, include various enterprise systems like ERP and WMS that emit operational events to be captured and processed by Notification Engine 800 for notification triggers. In some embodiments, RTDM 710 is employed to establish an integrated link, filtering and standardization between Event Source Applications 830 and Notification Architecture 800, facilitating data flow and ensuring that notifications are generated based on the current, real-time, operational events.

Messaging Interface 850, indicated as Pub/Sub Topics, manages the event messages via a publish/subscribe mechanism. This interface is critical for the asynchronicity of message queuing, which allows the system to handle varying loads and maintain a consistent flow of notifications. In some embodiments, Messaging Interface 850 be operably connected and/or integrated with RTDM 710 to prioritize and route messages, optimizing the delivery of notifications based on real-time data analysis and user engagement metrics.

Notification Engine 720 comprises sub-modules including Notification Engine 720 itself and Notification API 870, which are responsible for the evaluation of events and formulation of notifications. These sub-modules apply criteria to incoming data to determine notification triggers and manage the workflow from event detection to notification dispatch. Notification Engine 720 can incorporate or operably connect to AAML Module 715, configured to apply machine learning algorithms for pattern detection and predictive analytics, thereby refining the criteria used for notification triggers within Notification APIs 870.

In some embodiments, Notification APIs 870, interconnected with Notification Engine 720, apply predetermined criteria to incoming data to trigger appropriate notifications. Channel Provider 871 manages the dispatch of notifications through email services, ensuring reliable delivery to Users/Subscribers. In some embodiments, the SPoG UI 705 provides an integrated platform that enables users to interact with, manage, and personalize their notification experiences, thereby optimizing the interface for various user segments. SPoG UI 705 can include user-centered design, enabling real-time monitoring and management of alerts and notifications through customizable dashboards. In some embodiments, AAML Module 715 is configured to enhance functionality of Notification APIs 870 by incorporating user behavior models that adapt over time, providing a feedback loop mechanism for the continuous improvement of the notification system.

Load Balancing Interface 880 is designed with dynamic distribution algorithms to equitably manage incoming requests, ensuring system reliability and avoiding bottlenecks. Serverless VPC Connector 890 establishes secure connections to cloud services, incorporating security measures such as automated patch management and network intrusion detection, thus enhancing the system's data security framework. In some embodiments, Load Balancing Interface 880 can be incorporated into, or otherwise configured to utilize, RTDM 710's real-time processing capabilities to dynamically adjust the distribution of network traffic, thereby maintaining system performance even under varying loads.

A Cloud Service Interface can include Cloud SQL Interface 860 and Cloud Storage Interface 861, each performing specific roles in data management. Cloud SQL Interface 860 handles structured data, providing managed database services, while Cloud Storage Interface 861 is configured for the storage of unstructured data, supporting analytics and historical data retrieval. In certain embodiments, Cloud SQL Interface 860 and Cloud Storage Interface 861 can be integrated with RTDM 710 to support structured and unstructured data flows, such that RTDM 710 is configured to provide real-time data warehousing to complement data management and retrieval functions of the cloud services.

Channel Provider 871, operably connected to Notification API 870, dispatches notifications through email services. This provider ensures the reliable delivery of notifications to Users/Subscribers, e.g., end-users who interact with the distribution platform and receive notifications and managing their preferences through the interfaces provided by the Notification Engine.

Load Balancing Interface 880 distributes incoming requests to prevent bottlenecks and to ensure system reliability. This interface employs algorithms that dynamically allocate system resources to maintain performance.

Serverless VPC Connector 890 establishes secure connections to cloud services, facilitating direct communication within the cloud provider's network, enhancing data security through measures such as encryption and intrusion detection.

Thereby, Notification Engine 720 incorporated into Notification Architecture 800 provides resilient and extensible notification to comply with evolving complexities and demands of technology distribution platforms. Notification Architecture 800 enables users and systems to be consistently engaged with the current, real-time information, improving the platform's overall responsiveness and operational efficiency.

Figure 9:
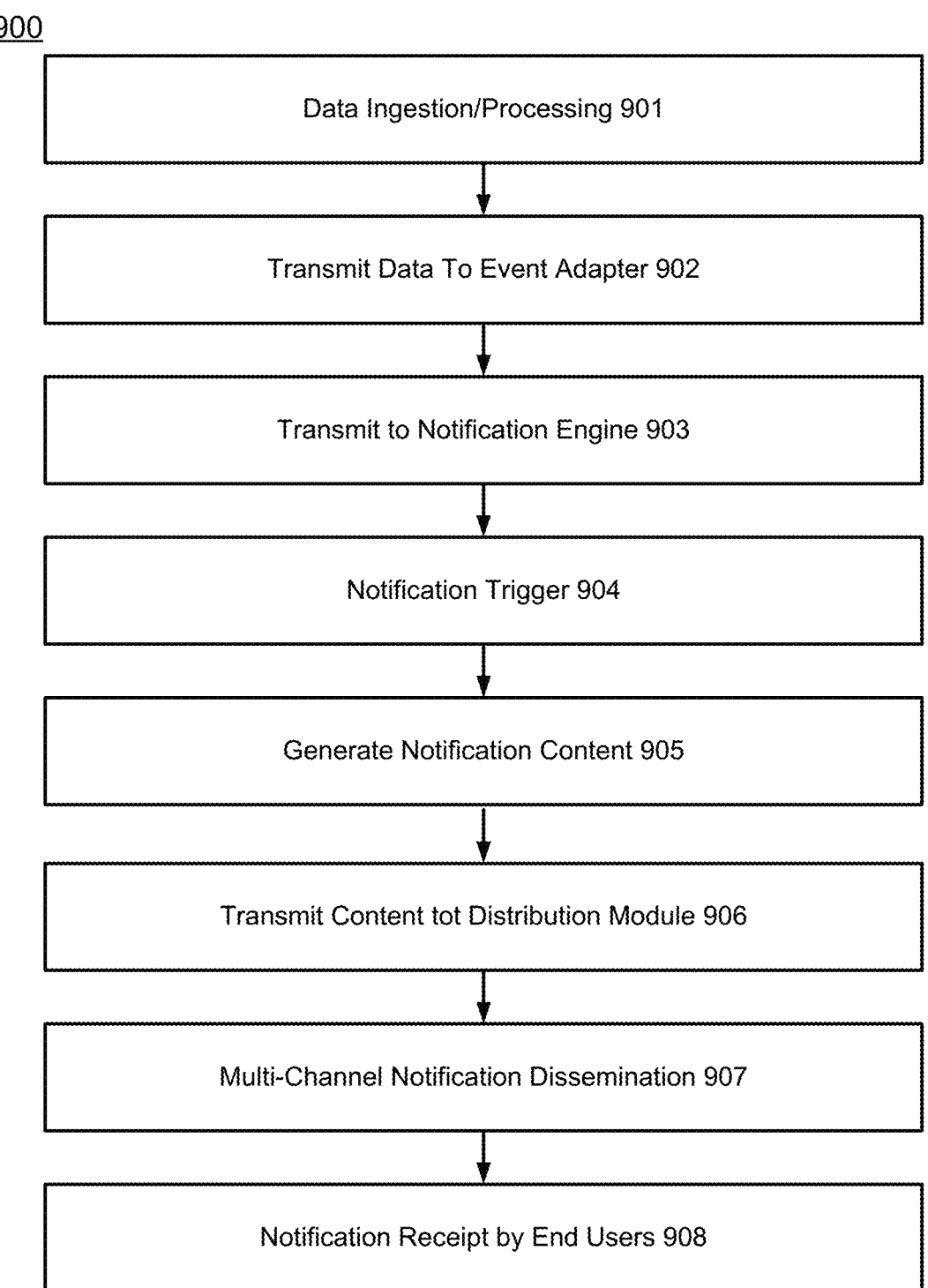
FIG. 9 is a flow diagram for automated alerts and notification management in a technology distribution platform, according to some embodiments of the present disclosure.

FIG. 9 illustrates a flow diagram of method 900 for managing data flow from event generation to notification dispatch within System 700. This flowchart outlines the sequential processing steps through which data transitions from raw events to refined notifications, highlighting the operational synergy between RTDM 710, Event Adapter 730, and Distribution Module 735. The method elucidates the transformation of diverse data inputs into structured, actionable alerts that are tailored to the users' specifications and distributed across multiple channels.

At Operation 901, the method commences with the collection of raw data from a multitude of event source applications. These sources may include, but are not limited to, ERP systems, WMS platforms, and direct user activities, which emit operational data pivotal to the alert generation process. Operation 901 can include ingesting the data by RTDM 710, where filtering and validation check can occur. Operation 901 can be performed to ensure that accurate data is processed and filtered based on relevance, maintaining the integrity of the notification system. Operation 901 can also include performing data enrichment by RTDM 710, where contextual information can be appended and/or associated to the data, augmenting it with additional details necessary for creating a comprehensive notification. This enriched data may include user preferences, historical interaction data, and related metadata. Operation 904 can further include standardization of the ingested data through RTDM 710. Data from the disparate sources can be transformed into a uniform format, which is essential for the subsequent processing steps and ensures consistency across the notification system.

At Operation 902, the standardized data is replicated to the Data Lake within RTDM 710, ensuring that a persistent, historical record of events and notifications is maintained for analytics and auditing purposes.

At Operation 903, the method advances with the transmission of standardized data to Event Adapter 730. Here, the data is structured into a compatible format for the Notification Engine, often utilizing JSON schemas or XML formats for interoperability and integration.

At Operation 904, Event Adapter 730 delivers the formatted data to the Notification Engine, where predefined rules and dynamic algorithms are applied at Operation 908 to ascertain the necessity of a notification trigger.

At Operation 905, upon determination of a trigger event, the Notification Engine crafts the notification content, leveraging template processing capabilities to generate alerts that are consistent and contextually tailored to the event and user profiles.

At Operation 906, the Notification Engine then passes the generated notifications to the Distribution Module 735, which is tasked with the dissemination of alerts across various channels.

At Operation 907, Distribution Module 735 employs a multi-channel approach, ensuring notifications are delivered through the most appropriate and effective mediums, such as email, SMS, or application-based push notifications, according to user preferences and channel availability.

At Operation 908 notifications are received by end-users, who can interact with and respond to the alerts through the SPoG UI, thereby closing the loop on the notification dispatch process and facilitating a continuous feedback mechanism for System 700.

Thereby, method 900 provides an efficient process flow for notification dispatch, from the point of data capture to the final user interaction, reinforcing the user-centric design of System 700.

Figure 10:
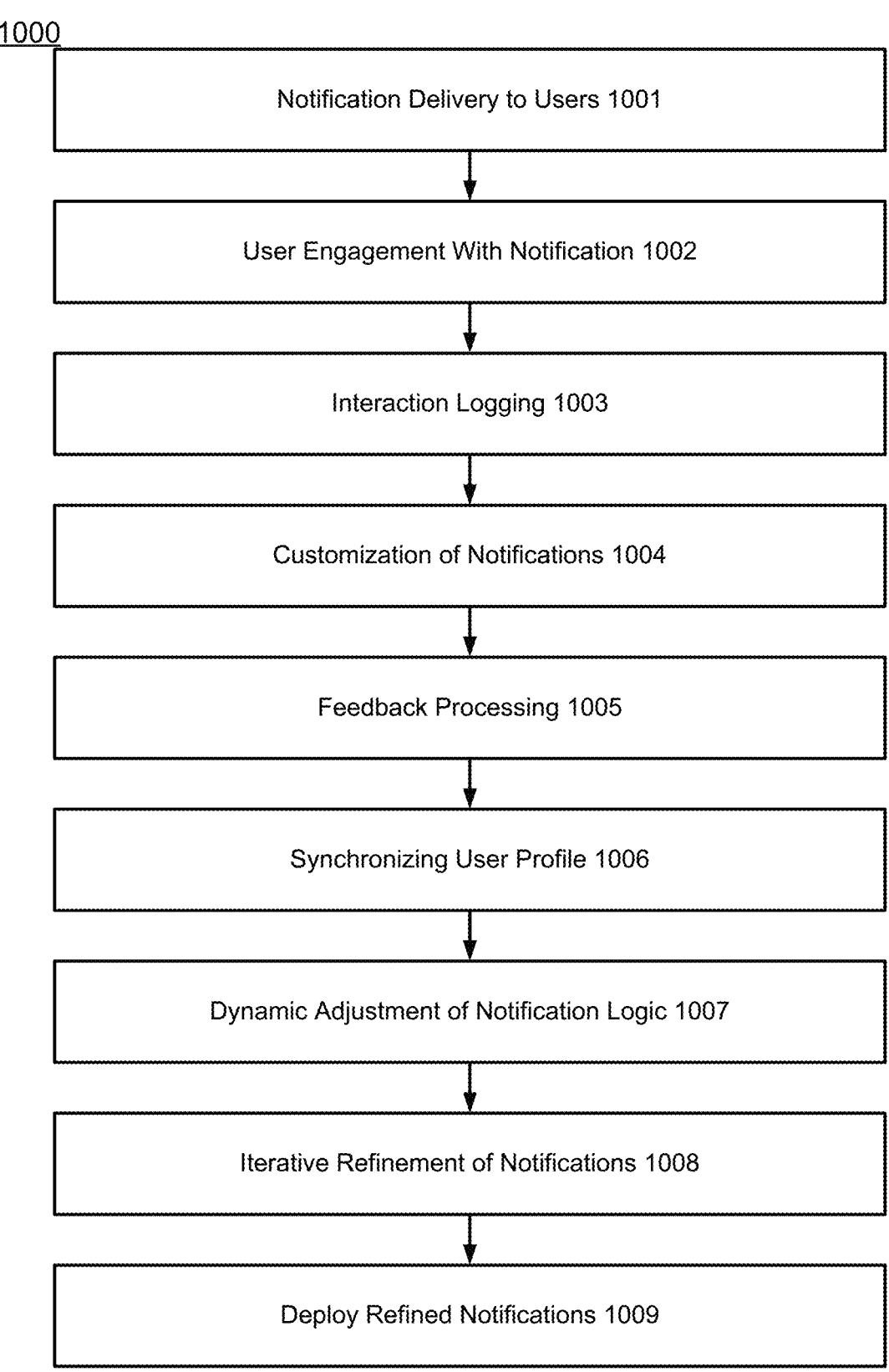
FIG. 10 is a flow diagram for user interaction with notifications in a technology distribution platform, according to some embodiments of the present disclosure.

FIG. 10 illustrates a flow diagram of method 1000 for user interaction with notifications within System 700. This flowchart details the user engagement sequence, showcasing how users receive, acknowledge, and interact with notifications through the Single Pane of Glass User Interface (SPoG UI). The method demonstrates the responsiveness of System 700 to user input, which ranges from basic notification acknowledgment to intricate user-driven configuration adjustments.

At Operation 1001, method 1000 initiates with the delivery of notifications to users through the SPoG UI 705. These notifications are the result of the processes detailed in FIG. 9, now presented to the user in a coherent and user-friendly manner on their respective device interfaces.

At Operation 1002, upon receiving a notification, the user engages with the alert through SPoG UI 705. This engagement could be an acknowledgment of receipt, a request for additional details, or an immediate response action, depending on the notification's nature and urgency.

At Operation 1003, user interactions are logged by the Consumer Interaction Module 706 within SPoG UI 705. This module captures and records the user's actions and preferences, contributing to a comprehensive history of user-notification interactions.

At Operation 1004, the Notification Customization Module 707 within SPoG UI 705 enables users to adjust notification parameters. Users can set preferences for notification frequency, channel, and format, tailoring the alerting experience to their individual needs.

At Operation 1005, method 1000 includes the processing of user feedback received through SPoG UI 705. This feedback could pertain to the notification's relevance, timeliness, or content quality, and is used to refine future notifications.

At Operation 1006, the user's preferences and feedback are synchronized with the user's profile in the backend systems, ensuring that all future notifications are aligned with the updated user settings and preferences. Operation 1006 can include analyzing, utilizing RTDM 710 in conjunction with AAML Module 715, aggregated user interaction data to identify trends and patterns in user behavior and notification interaction.

At Operation 1007, based on the analysis performed by RTDM 710 and AAML Module 715, System 700 can dynamically adjust the notification logic within the Notification Engine 720. This adjustment could involve altering notification rules, updating templates, or modifying delivery channels.

At Operation 1008, method 1000 progresses to the iterative refinement of notification content and delivery mechanisms. The continuous loop of user interaction data informs the evolution of the notification system, leading to increasingly personalized and relevant user experiences.

At Operation 1009, the refined notifications are then redeployed through the Distribution Module 735, closing the feedback loop by delivering the enhanced notifications back to the user via their preferred channels.

Thereby, System 700 provides a user-centric notification process in Method 1000, where each user interaction is captured, analyzed, and used to inform the system's behavior. Method 700 emphasizes the adaptability of the notification system to user preferences and behavior, providing a personalized and engaging user experience within the technology distribution platform.

Figure 11:
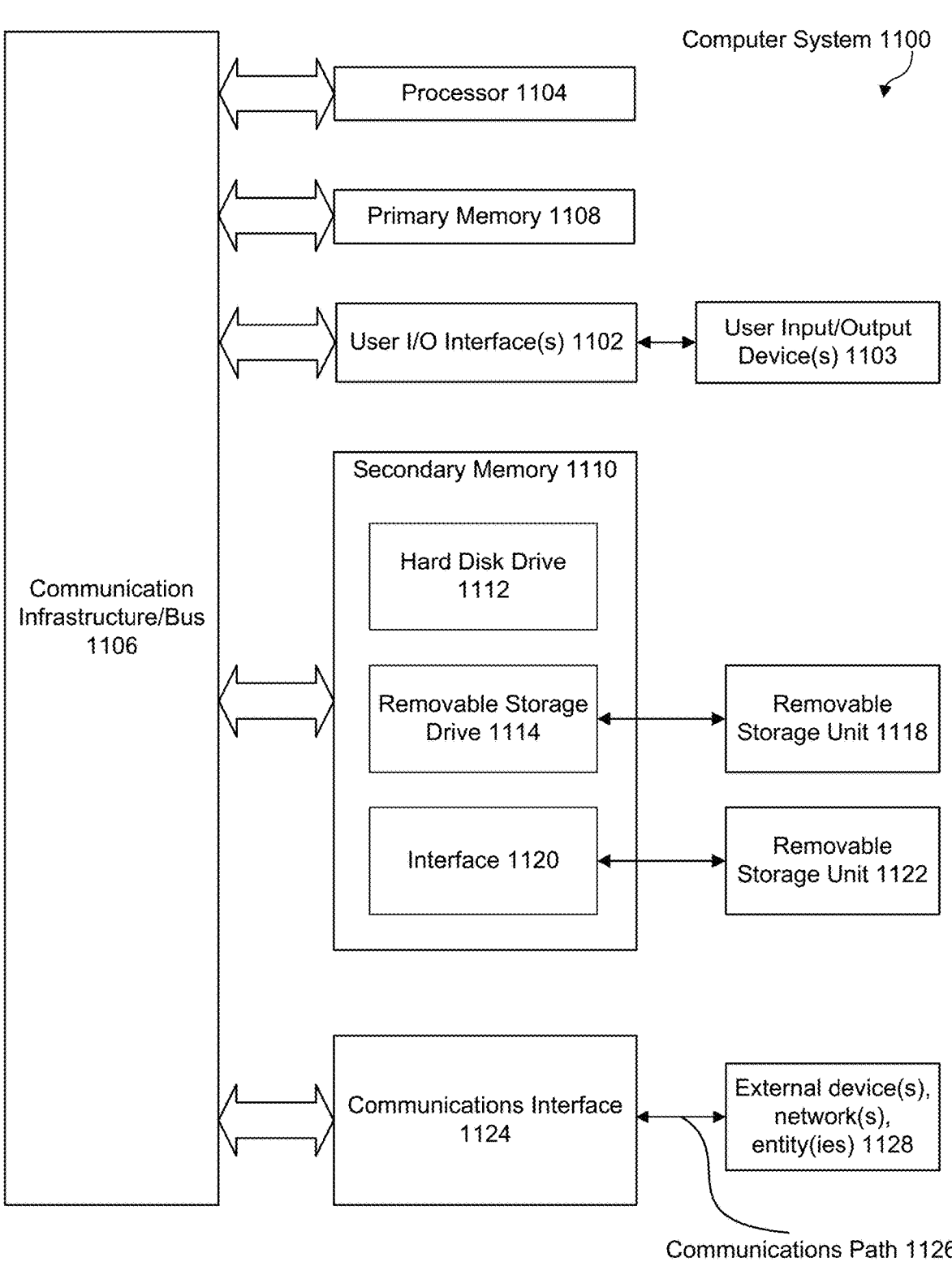
FIG. 11 is a block diagram of example components of device, according to some embodiments of the present disclosure.

FIG. 11 depicts a block diagram of example components of device 1100. One or more computer systems 1100 may be used, for example, to implement any of the embodiments discussed herein, as well as combinations and sub-combinations thereof. Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that can be a specialized electronic circuit configured to process mathematically intensive applications. The GPU may have a parallel structure that can be efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114.

Removable storage drive 1114 may interact with a removable storage unit 1118. Removable storage unit 1118 may include a computer-usable or readable storage device having stored thereon computer software (control logic) and/or data. Removable storage unit 1118 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Figure 12A:
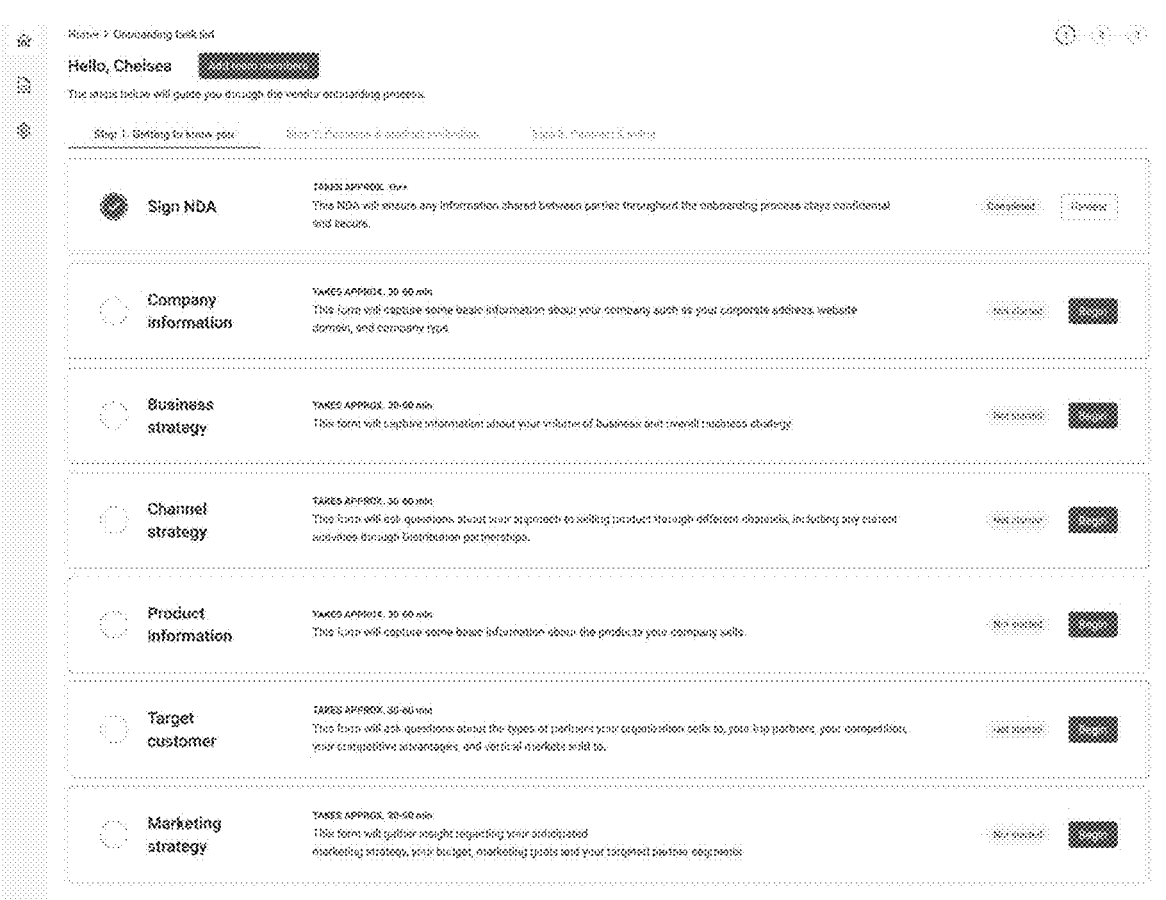
FIGS. 12A to 12Q depict various screens and functionalities of the SPoG UI, according to some embodiments.
Figure 12B:
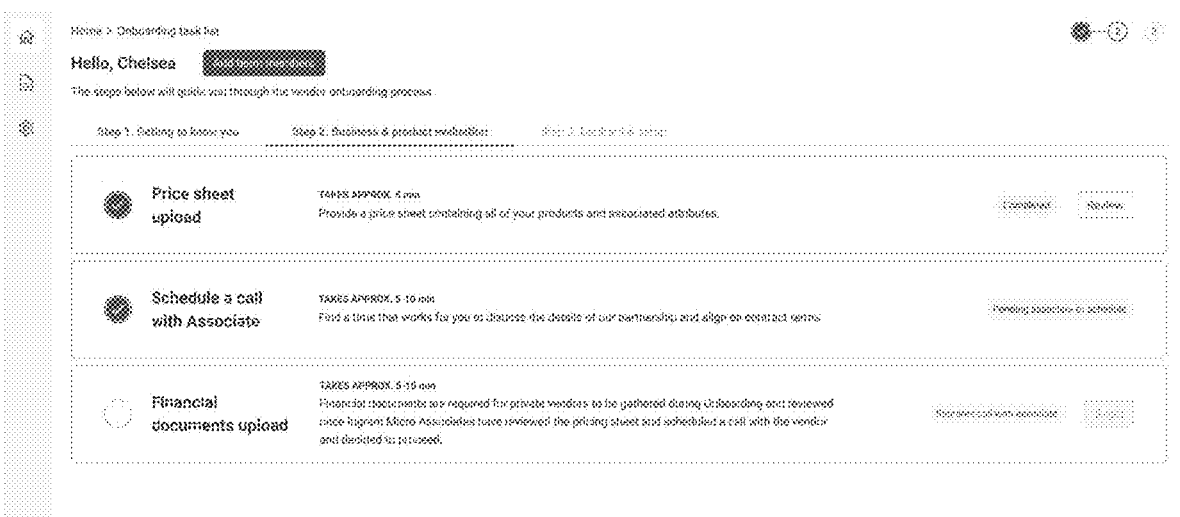
Figure 12C:
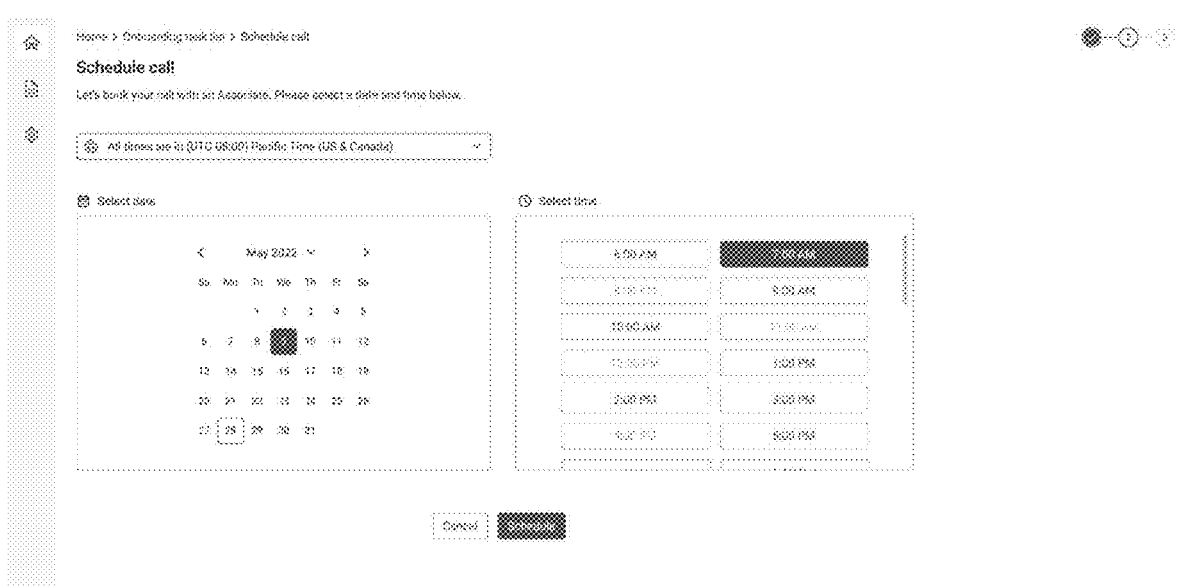
Figure 12D:
Figure 12E:
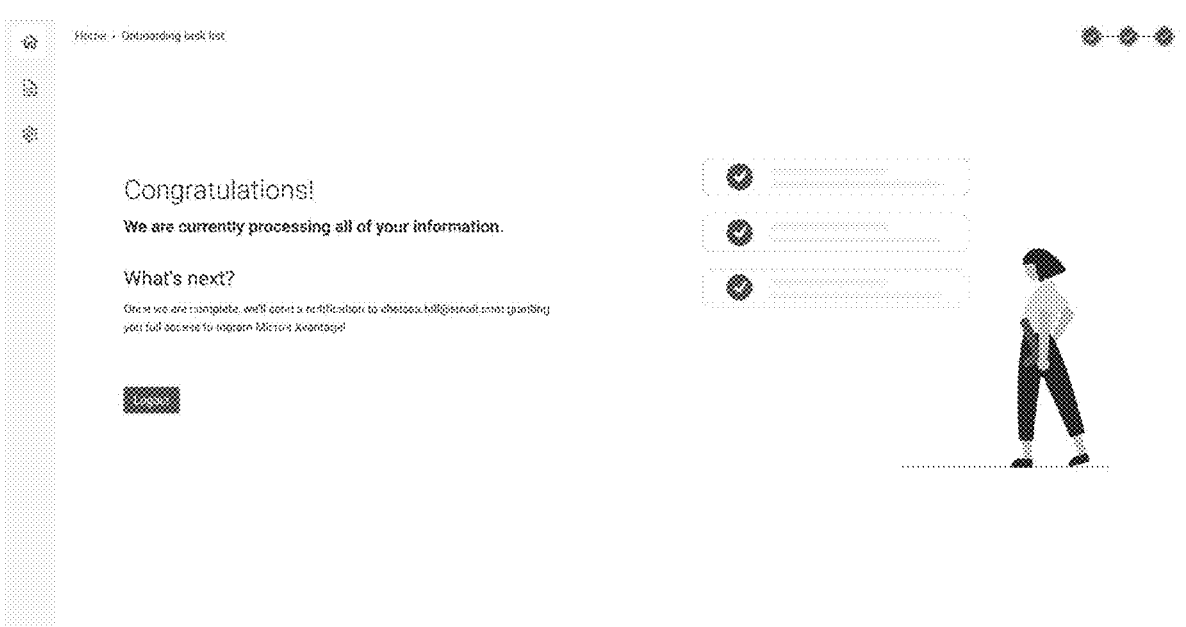
Figure 12F:
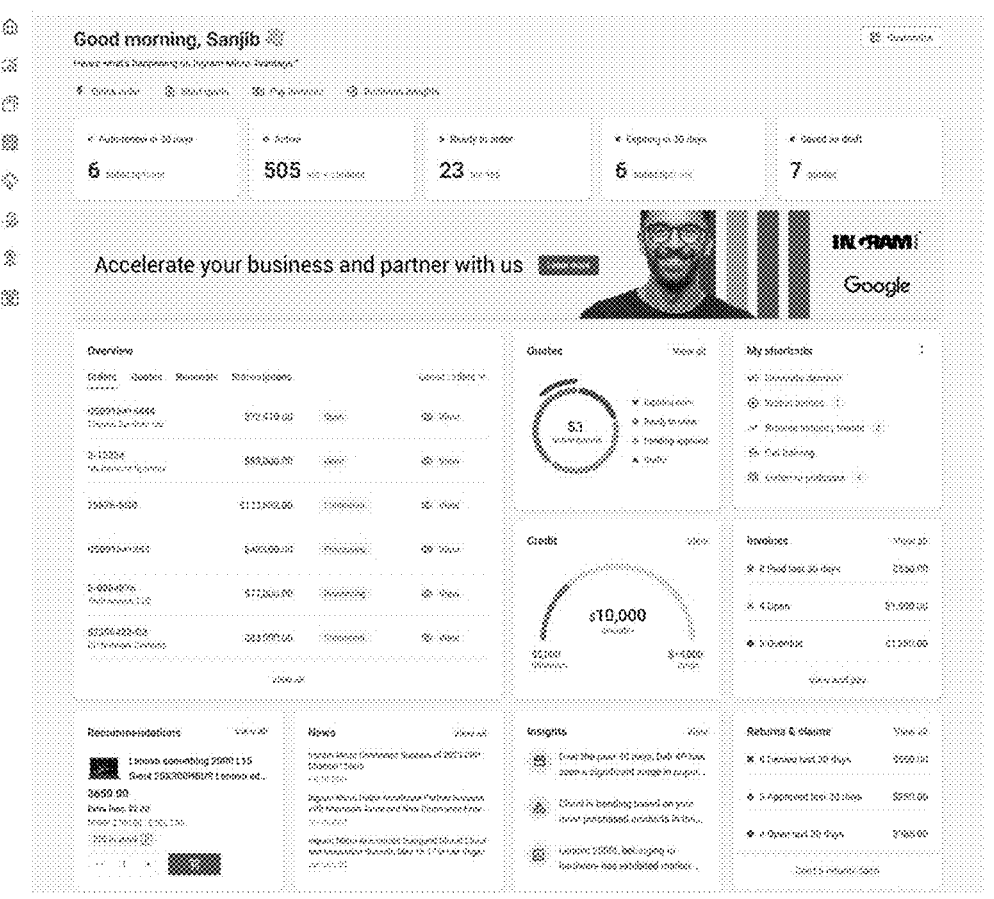
Figure 12G:
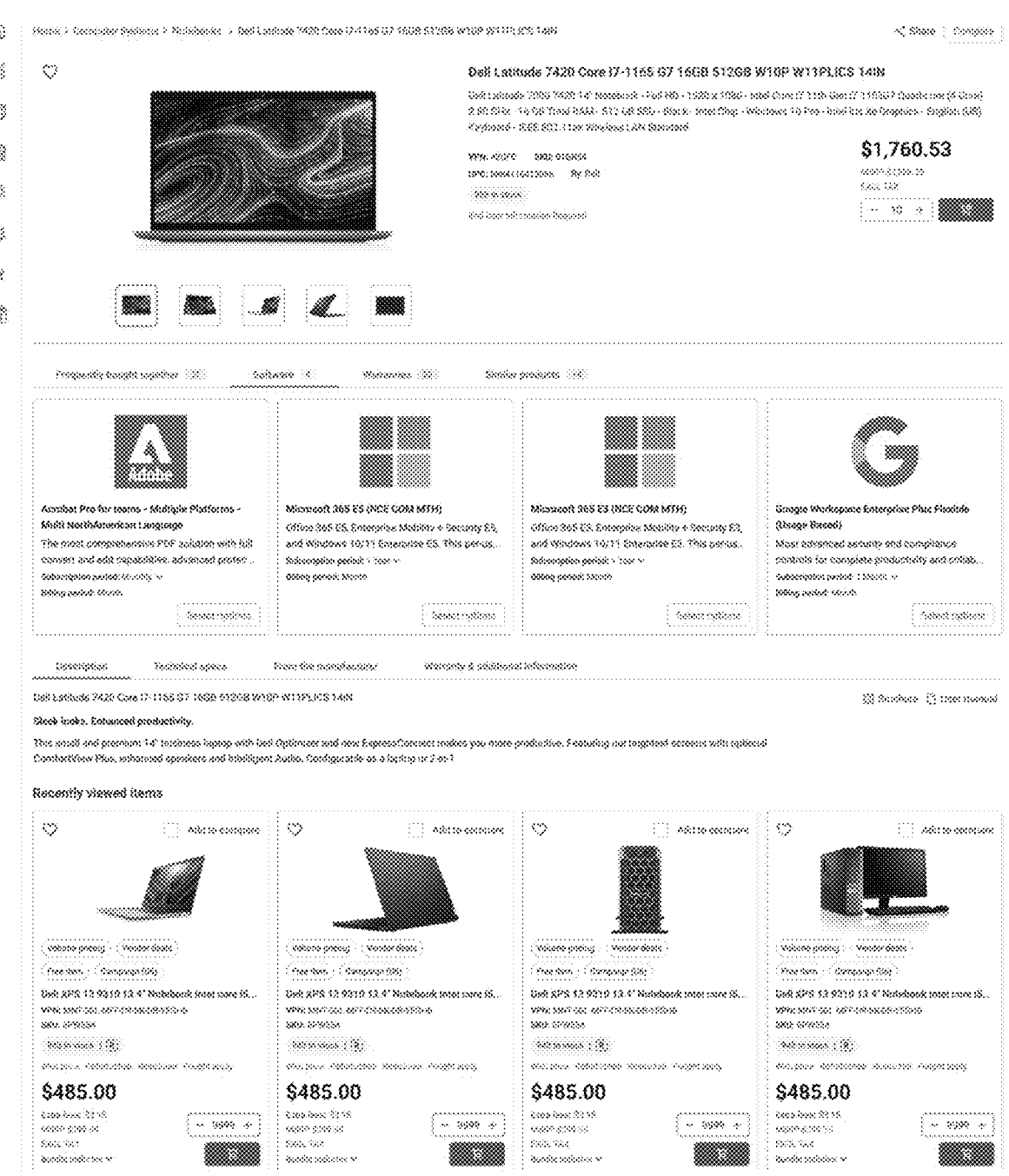
Figure 12H:
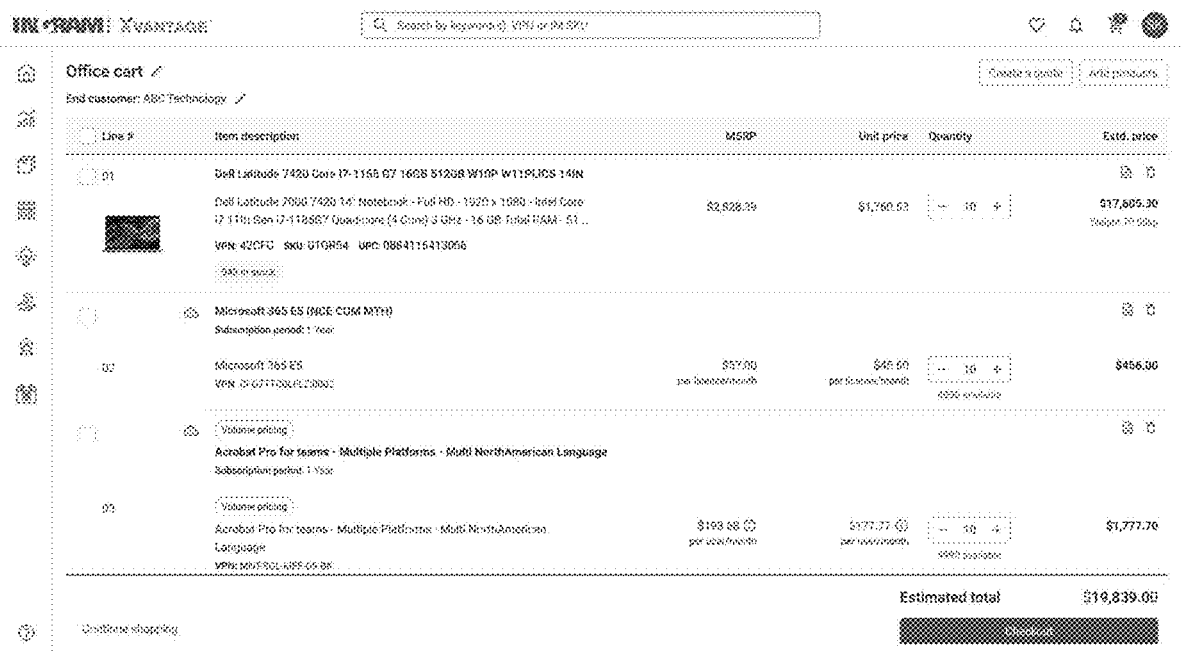
Figure 12I:
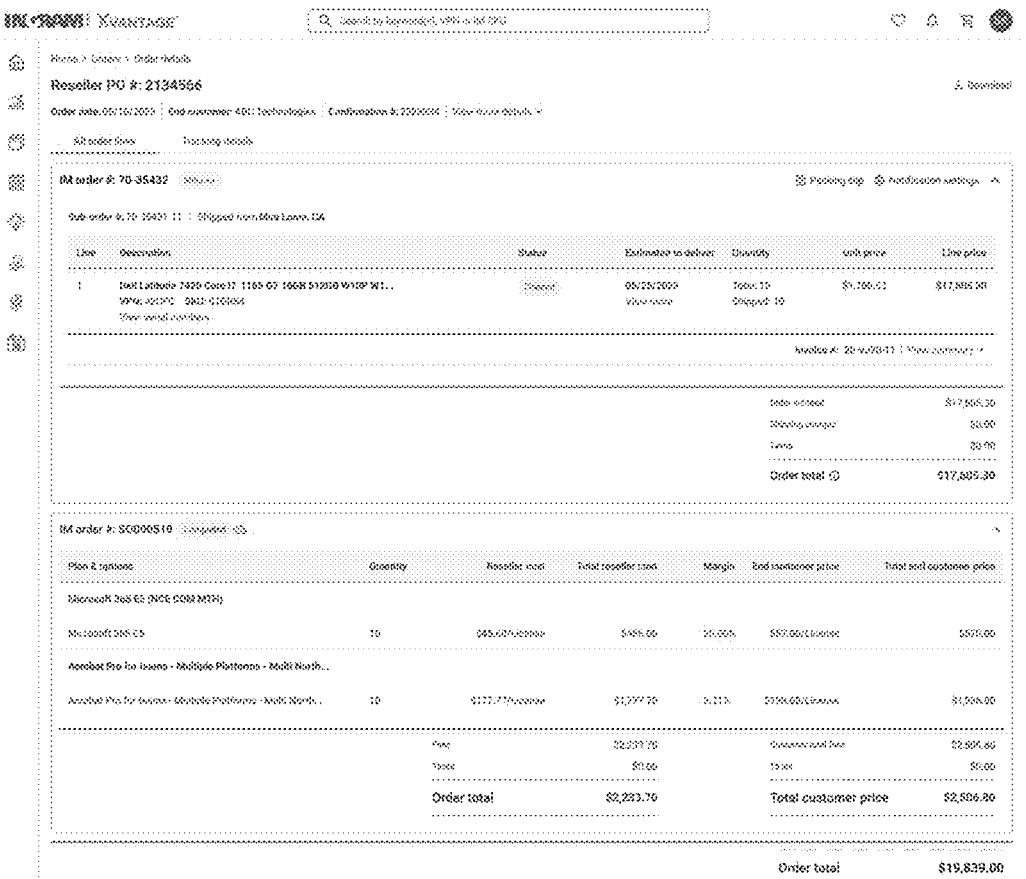
Figure 12J:
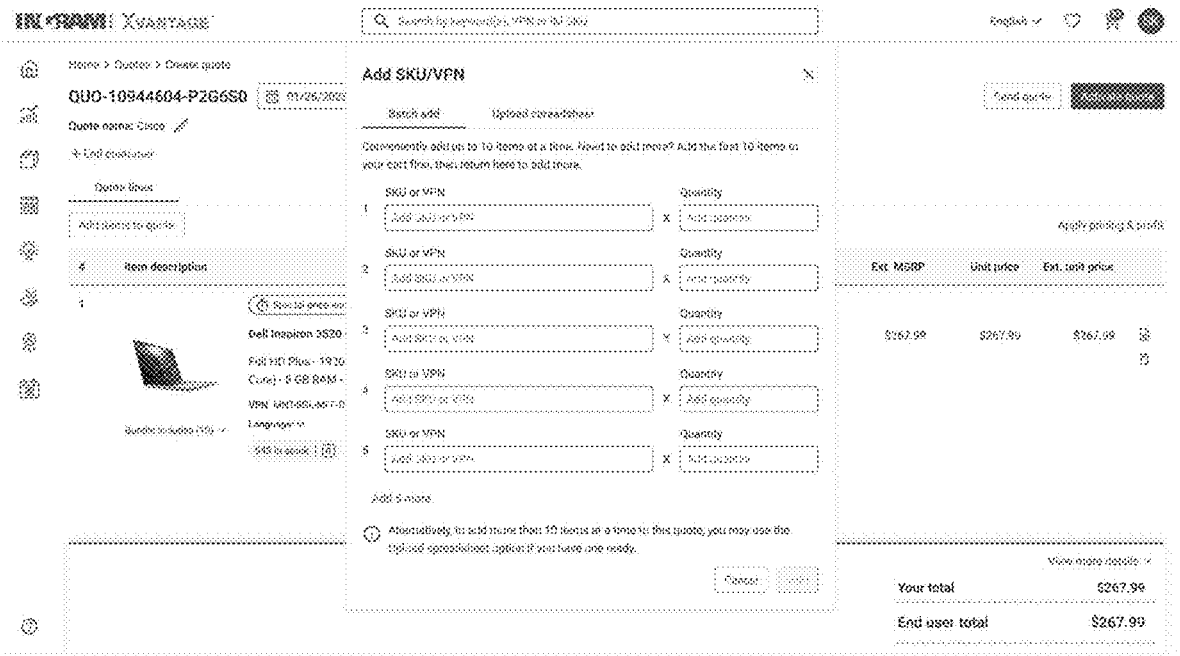
Figure 12K:
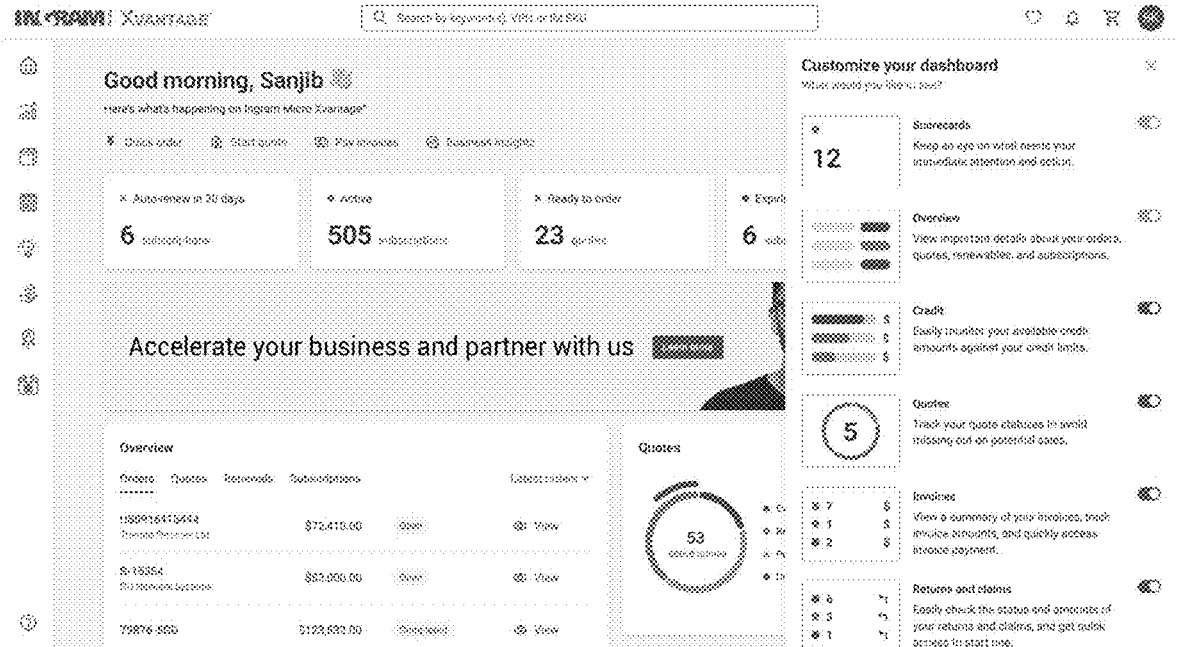
Figure 12L:
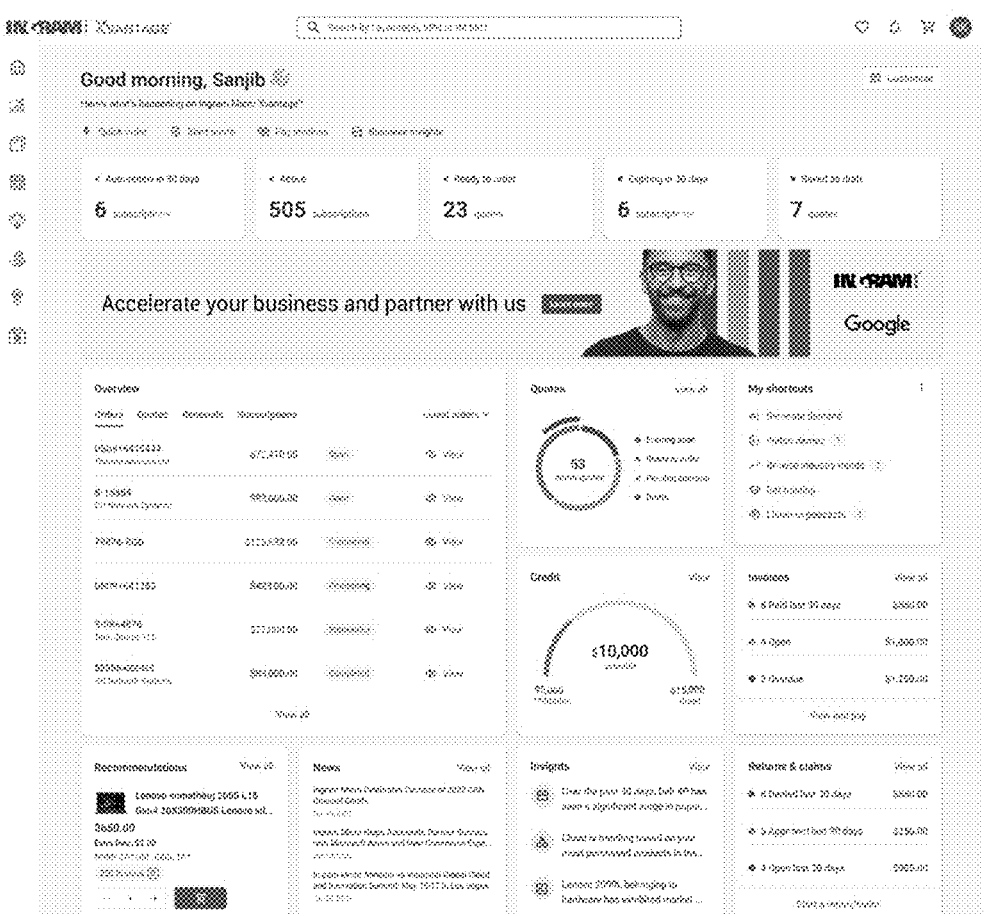
Figure 12M:
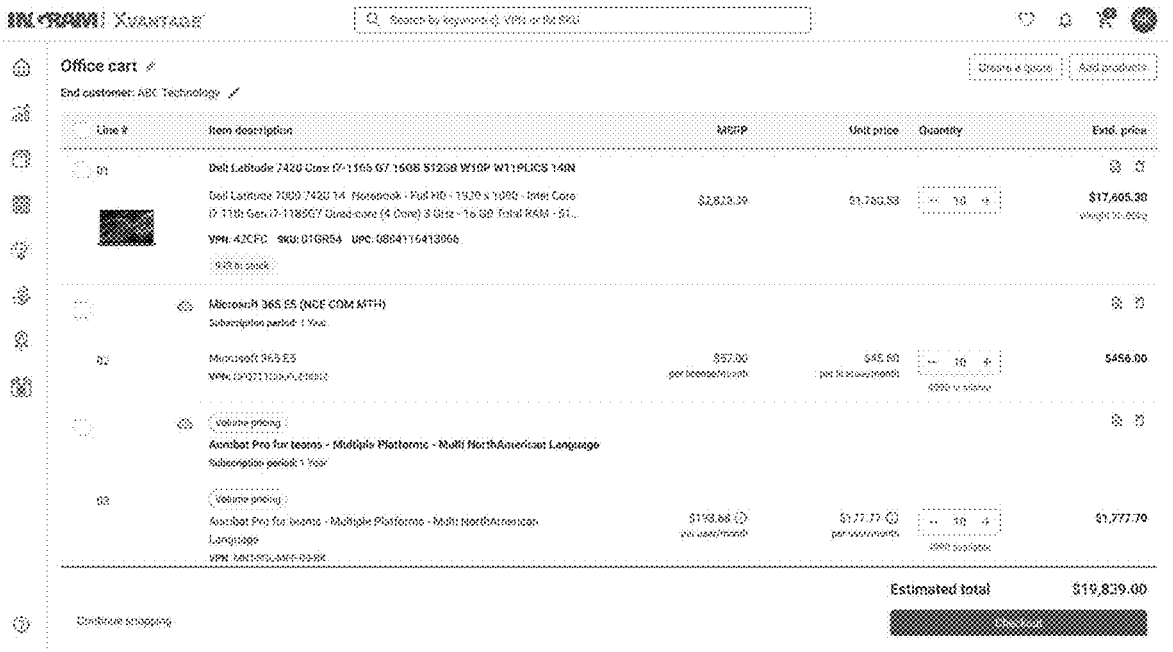
Figure 12N:
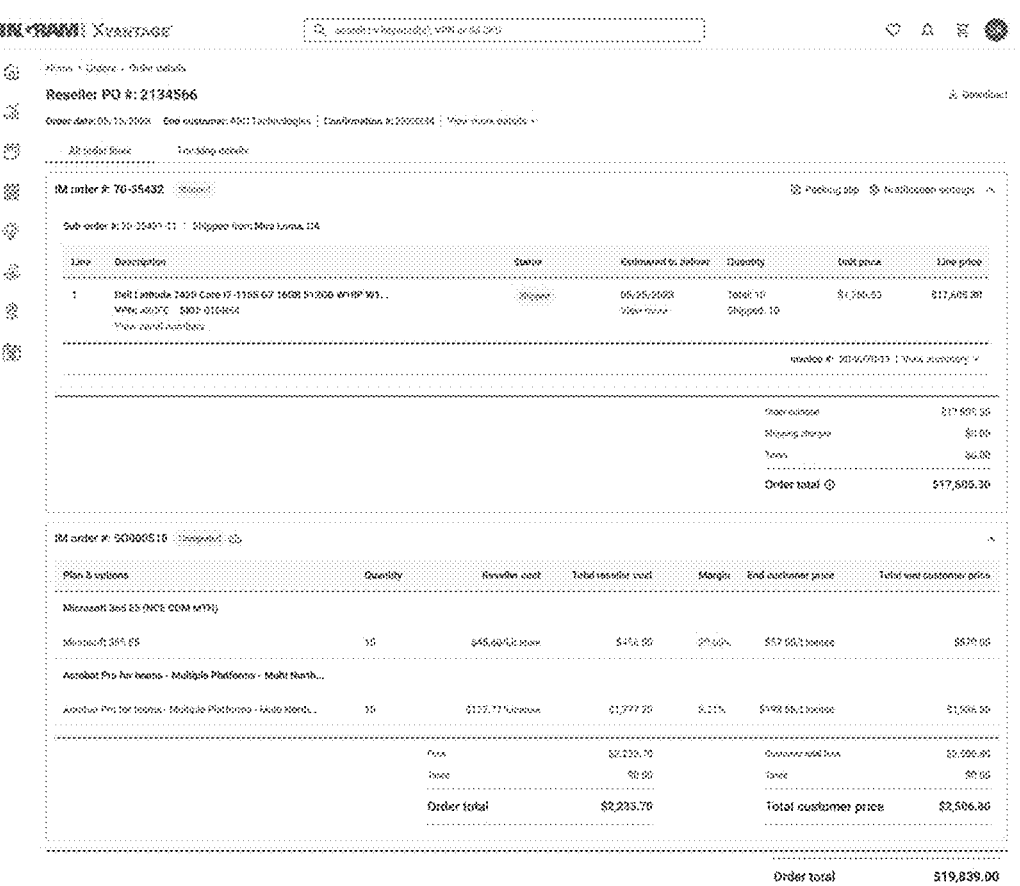
Figure 12O:
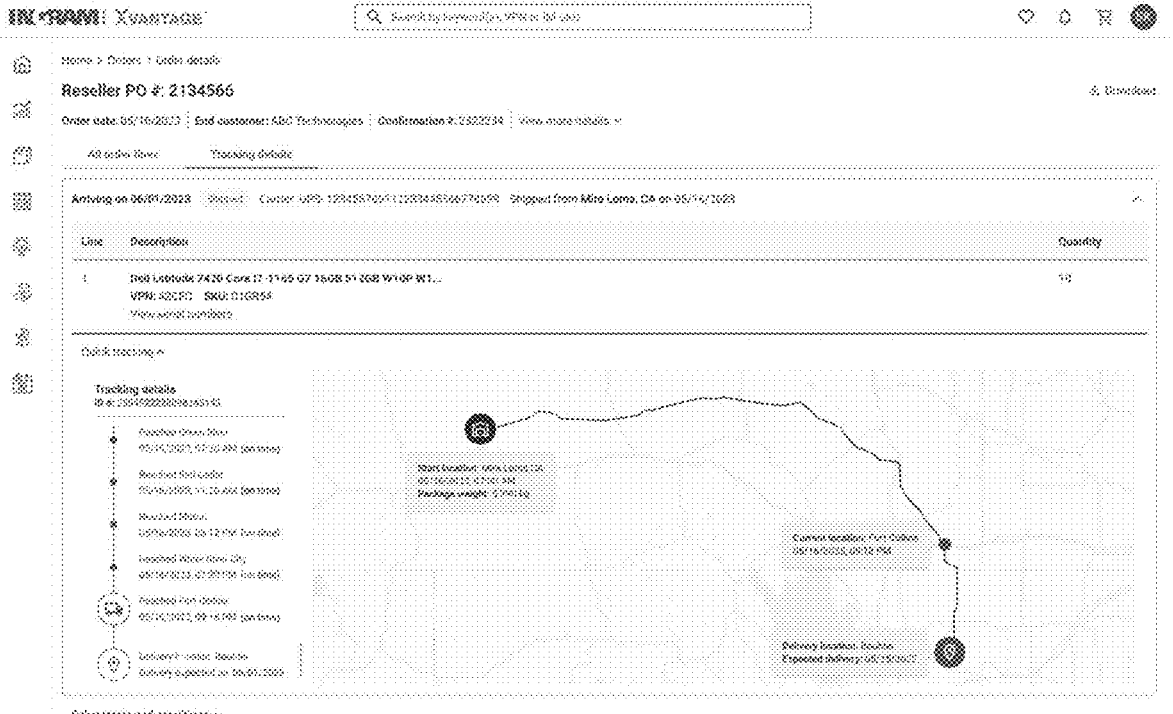
Figure 12P:
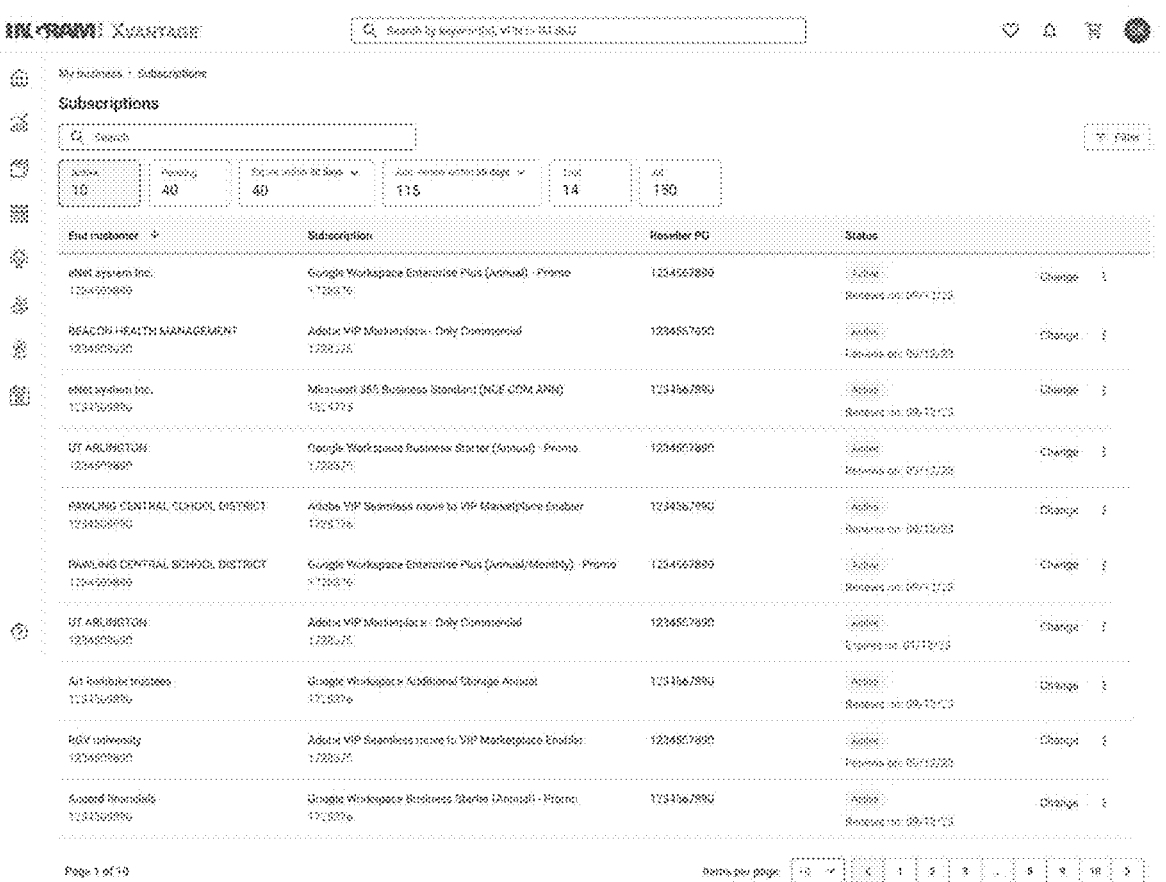
Figure 12Q:
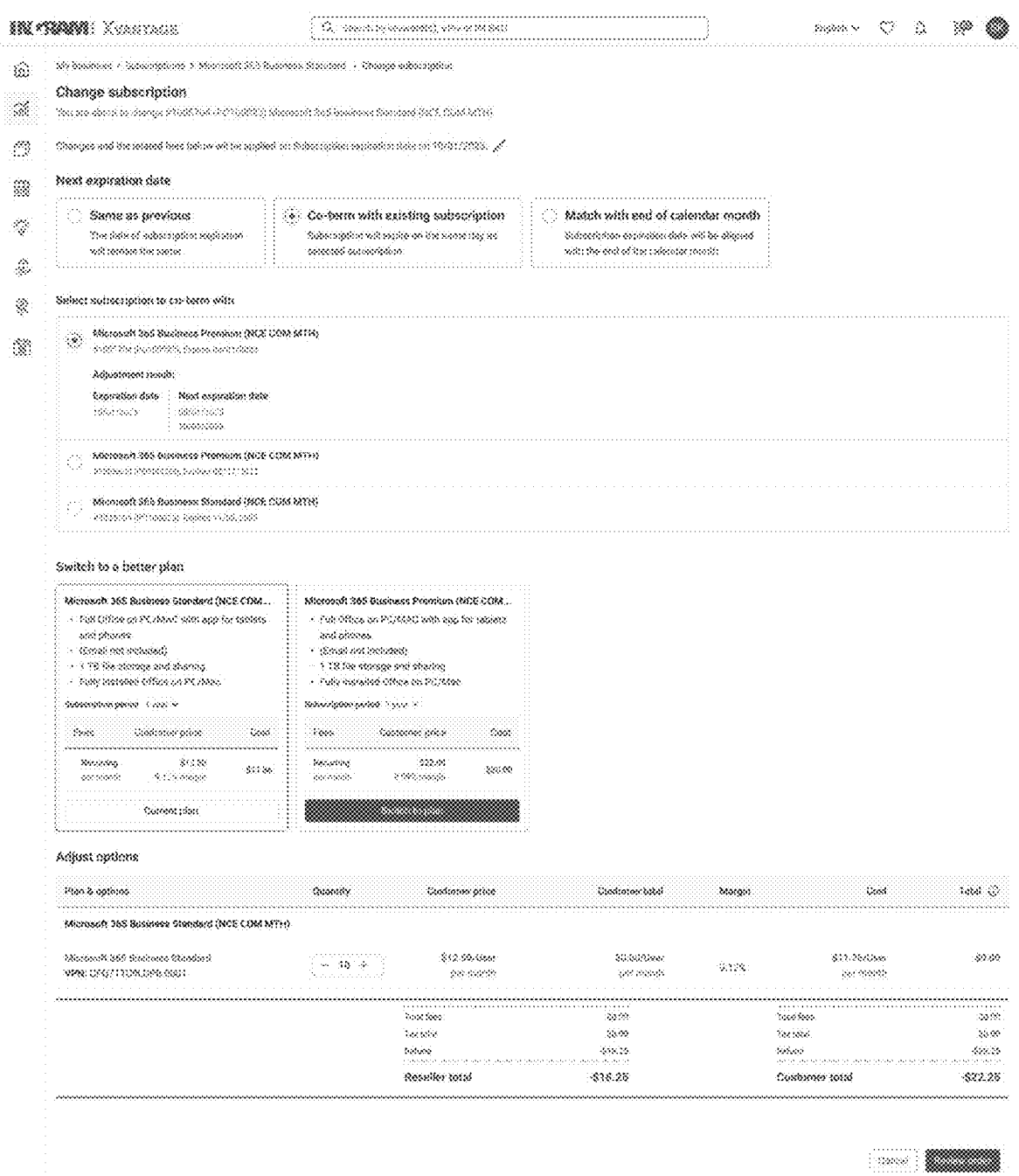

FIGS. 12A to 12Q depict various screens and functionalities of the SPoG UI related to vendor onboarding, partner dashboard, customer carts, order summary, SKU generation, order tracking, shipment tracking, subscription history, and subscription modifications. A detailed description of each figure is provided below:

FIG. 12A depicts a Vendor Onboarding Initiation screen that represents the initial step of the vendor onboarding process. It provides a form or interface where vendors can express their interest in joining the distribution ecosystem. Vendors can enter their basic information, such as company details, contact information, and product catalogs.

FIG. 12B depicts a Vendor Onboarding Guide that displays a step-by-step guide or checklist for vendors to follow during the onboarding process. It outlines the necessary tasks and requirements, ensuring that vendors have a clear understanding of the onboarding process and can progress smoothly.

FIG. 12C depicts a Vendor Onboarding Call Scheduler that facilitates scheduling calls or meetings between vendors and platform associates or representatives responsible for guiding them through the onboarding process. Vendors can select suitable time slots or request a call, ensuring effective communication and assistance throughout the onboarding journey.

FIG. 12D depicts a Vendor Onboarding Task List that presents a comprehensive task list or dashboard that outlines the specific steps and actions required for successful vendor onboarding. It provides an overview of pending tasks, completed tasks, and upcoming deadlines, helping vendors track their progress and ensure timely completion of each onboarding task.

FIG. 12E depicts a Vendor Onboarding Completion Screen that confirms the successful completion of the vendor onboarding process. It may display a congratulatory message or summary of the completed tasks, indicating that the vendor is now officially onboarded into the distribution ecosystem.

FIG. 12F depicts a Partner Dashboard that offers partners or users a centralized view of relevant information and metrics related to their partnership with the distribution ecosystem. It provides an overview of performance indicators, key data points, and actionable insights to facilitate effective collaboration and decision-making.

FIG. 12G depicts a Customer Product Cart that represents the customer's product cart, where they can add items they wish to purchase. It displays a list of selected products, quantities, prices, and other relevant details. Customers can review and modify their cart contents before proceeding to the checkout process.

FIG. 12H depicts a Customer Subscription Cart that allows customers to manage their subscription-based purchases. It displays the selected subscription plans, pricing, and duration. Customers can review and modify their subscription details before finalizing their choices.

FIG. 12I depicts a Customer Order Summary that provides a summary of the customer's order, including details such as the products or subscriptions purchased, quantities, pricing, and any applied discounts or promotions. It allows customers to review their order before confirming the purchase.

FIG. 12J depicts a Vendor SKU Generation screen for generating unique Stock Keeping Unit (SKU) codes for vendor products. It may include fields or options where vendors can specify the product details, attributes, and pricing, and the system automatically generates the corresponding SKU code.

FIGS. 12K and 12L depicts Dashboard Order Summary to display summarized information about orders placed within the distribution ecosystem. They present key order details, such as order number, customer name, product or subscription information, quantity, and order status. The dashboard provides an overview of order activity, enabling users to track and manage orders efficiently.

FIG. 12M depicts a Customer Subscription Cart that permits a customer to add, modify, or remove subscription plans. It can display a list of selected subscriptions, pricing, and renewal dates. Customers can manage their subscriptions and make changes according to their preferences and requirements.

FIG. 12N depicts a Customer Order Tracking screen that enables customers to track the status and progress of their orders within the supply chain. It displays real-time updates on order fulfillment, including processing, packaging, and shipping. Customers can monitor the movement of their orders and anticipate delivery times.

FIG. 12O depicts a Customer Shipment Tracking that provides customers with real-time tracking information about their shipments. It may include details such as the carrier, tracking number, current location, and estimated delivery date. Customers can stay informed about the whereabouts of their shipments.

FIG. 12P depicts a Customer Subscription History, that presents a historical record of the customer's subscription activities. It displays a list of previous subscriptions, including the subscription plan, duration, and status. Customers can review their subscription history, track past payments, and refer to previous subscription details.

FIG. 12Q depicts a Customer Subscription Modifications dialog, that allows customers to modify their existing subscriptions. It offers options to upgrade or downgrade subscription plans, change billing details, or adjust other subscription-related preferences. Customers can manage their subscriptions according to their evolving needs or preferences.

The depicted UI screens are not limiting. In some embodiments the UI screens of FIGS. 12A to 12Q collectively represent the diverse functionalities and features offered by the SPoG UI, providing users with a comprehensive and user-friendly interface for vendor onboarding, partnership management, customer interaction, order management, subscription management, and tracking within the distribution ecosystem.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for managing alerts and notifications within a technology distribution platform, comprising:

(a) a Real-Time Data Mesh (RTDM) configured to monitor a plurality of source systems for event data, wherein the RTDM includes a change data capture (CDC) mechanism comprising:

(i) a log-based change tracking process that captures transactional updates from system-generated logs;

(ii) a trigger-based event detection system that intercepts real-time data modifications at a source database level; and/or (iii) a polling-based retrieval mechanism for querying systems where event-driven tracking is not feasible;

(b) a data transformation engine within the RTDM configured to standardize and enrich captured event data using schema adaptation techniques and normalization procedures, and propagate the standardized event data to the event adapter for downstream notification processing via at least one of a plurality of Purposive Datastores (PDSes);

(c) a distributed storage framework coupled to the RTDM, the storage framework including a Global Data Lake comprising the plurality of Purposive Datastores (PDSes), each PDS configured for optimized retrieval based on data classification, access frequency, or computational workload, wherein the standardized event data is allocated to the PDSes for communicating to the event adapter based on relevance to the downstream notification processing;

(d) an advanced analytics and machine learning (AAML) module configured to process user interaction data and customization inputs to adapt notification logic;

(e) an event adapter configured to retrieve the standardized event data in parallel from the PDSes and transform, using the AAML, the standardized event data into a format compatible with the notification engine;

(f) a notification engine coupled to the event adapter and configured to:

(i) determine notification triggers and generate alert content based on one or more dynamic rules or algorithms applied to the PDS-allocated event data by the AAML; and (ii) utilize one or more machine learning algorithms, including at least one reinforcement learning algorithm by the AAML, to dynamically adjust notification triggers and alert content, based on real-time analysis of user interaction data and system performance feedback, wherein the reinforcement learning algorithm continually refines notification parameters to enhance alert relevance and timing;

(g) a user interaction module integrated with a Single Pane of Glass User Interface (SPoG UI), the user interaction module configured to present notifications generated by the notification engine and capture user customization inputs specifying alert preferences, thresholds, and/or delivery channels;

(h) a distribution module configured to deliver refined notifications from the notification engine to the SPoG UI across multiple communication channels and iteratively adjust delivery mechanisms based on engagement metrics and channel availability.

2. The system of claim 1, wherein the SPoG UI includes real-time visualization tools for monitoring alert statuses and managing notification preferences.

3. The system of claim 1, wherein the RTDM is configured to maintain real-time synchronization with the plurality of source systems to ensure data accuracy and timeliness.

4. The system of claim 1, wherein the Notification Engine is configured to orchestrate a workflow of notification generation from event detection to dispatch.

5. The system of claim 1, wherein the Distribution Module supports a plurality of communication protocols, the plurality of communication protocols including one or more of MQTT and AMQP for broadcasting notifications, and wherein the system supports interoperability utilizing JSON schemas and XML formats for data compatibility.

6. The system of claim 1, wherein the user interaction module allows users to customize alert thresholds, notification frequency, and channel preferences.

7. The system of claim 1, further including analytics and reporting means for generating real-time reports on notification engagement metrics and user response rates.

8. A computerized method for managing alerts and notifications within a technology distribution platform, the method comprising:

(a) monitoring, by a Real-Time Data Mesh (RTDM), a plurality of source systems to detect event data, wherein the monitoring comprises a change data capture (CDC) process including:

(i) capturing, by a log-based change tracking process, updates from system-generated logs;

(ii) intercepting, by a trigger-based detection process, real-time modifications at source database levels; and/or (iii) polling, by a retrieval mechanism, source systems that lack event-driven integration;

(b) transforming, by the RTDM, the captured event data into a standardized format through schema adaptation, normalization, and enrichment, and propagating the standardized event data to an event adapter for downstream notification processing via at least one of a plurality of Purposive Datastores (PDSes);

(c) allocating, by the RTDM, the standardized event data into a Global Data Lake including distributing the data across a plurality of Purposive Datastores (PDSes), each PDS configured for optimized retrieval based on data classification, access frequency, or computational workload, wherein the standardized event data is allocated to the PDSes for communicating to the event adapter based on relevance to the downstream notification processing;

(d) processing, by an advanced analytics and machine learning (AAML) module, user interaction data and customization inputs to adapt notification logic;

(e) retrieving, by the event adapter, the standardized event data in parallel from the PDSes and transforming, by an event adapter using the AAML, the standardized event data into a format compatible with a notification engine;

(f) determining, by the notification engine, notification triggers and generating alert content based on a set of one or more dynamic rules or algorithms applied to the PDS-allocated event data by the AAML;

(g) utilizing, by the notification engine, one or more machine learning algorithms of the AAML comprising at least one reinforcement learning algorithm to dynamically adjust notification triggers and alert content, based on real-time analysis of the user interaction data and system performance feedback, wherein the reinforcement learning algorithm continually refines notification parameters to enhance alert relevance and timing;

(h) presenting, by a user interaction module user interactions integrated with a Single Pane of Glass User Interface (SPoG UI), notifications generated by the notification engine and capturing user customization inputs specifying alert preferences, thresholds, and/or delivery channels via a user interface;

(h) adapting, by an advanced analytics machine learning (AAML) module, the notification logic based on the interaction data and customization inputs;

(i) delivering, by a distribution module, refined notifications from the notification engine to the SPoG UI across multiple communication channels and iteratively adjusting delivery mechanisms based on engagement metrics and channel availability.

9. The method of claim 8, further comprising maintaining, by the RTDM, real-time synchronization with the plurality of source systems to enable current data accuracy.

10. The method of claim 8, further comprising orchestrating, by the Notification Engine, a workflow of notification generation from event detection to dispatch.

11. The method of claim 8, further comprising broadcasting notifications utilizing one or more communication protocols, the one or more protocols selected from MQTT and AMQP, and wherein the use of JSON schemas and XML formats for data interoperability across system boundaries.

12. The method of claim 8, receiving, by the user interaction Module one or more alert thresholds, notification frequency, and channel preferences input by the user.

* * * * *